United States Patent
Hagai et al.

(10) Patent No.: US 6,891,799 B1
(45) Date of Patent: May 10, 2005

(54) DATA TRANSMISSION METHOD

(75) Inventors: Makoto Hagai, Osaka (JP); Hideaki Fukushima, Kashiba (JP); Yoshinori Matsui, Katano (JP); Seiji Horii, Kashihara (JP); Tatsuya Ohnishi, Kawanishi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/450,670

(22) Filed: Nov. 30, 1999

(30) Foreign Application Priority Data

Nov. 30, 1998 (JP) .......................................... 10-340468

(51) Int. Cl.$^7$ ............................................. G01R 31/08
(52) U.S. Cl. ..................... 370/235; 714/748; 714/751
(58) Field of Search ............................... 370/229, 230, 370/230.1, 231, 232, 233, 234, 235, 236, 235.1, 241, 241.1, 242, 243, 244, 246, 249, 250, 252, 253, 216, 428, 429; 714/748, 751, 776, 779; 375/240, 240.01, 240.02, 240.05, 240.07, 240.26, 240.27; 348/387.1, 390.1, 425.1, 425.2

(56) References Cited

U.S. PATENT DOCUMENTS

| | | | |
|---|---|---|---|
| 5,553,083 A | | 9/1996 | Miller |
| 5,629,936 A | * | 5/1997 | Lee et al. .................... 370/230 |
| 5,768,527 A | * | 6/1998 | Zhu et al. .................... 709/231 |
| 6,104,757 A | * | 8/2000 | Rhee ....................... 375/240.12 |
| 6,490,705 B1 | * | 12/2002 | Boyce ......................... 714/776 |
| 6,496,481 B1 | * | 12/2002 | Wu et al. .................... 370/242 |

FOREIGN PATENT DOCUMENTS

| | | |
|---|---|---|
| JP | 5-316147 | 11/1993 |
| JP | 7-7516 | 1/1995 |
| JP | 11-284657 | 10/1999 |

OTHER PUBLICATIONS

Wilson, D. and M. Ghanbari. "An Efficient Loss Priority Scheme for MPEG–2 Variable Bit Rate Video for ATM Networks," Global Telecommunications Conference, IEEE, Nov. 18, 1996, pp. 1954–1958.

Dan Picker et al., "Scaling and Performance of a Priority Packet Queue for Real–Time Applications", Department of Electrical and Computer Engineering, University of California, 1994, pp. 56–62.

G. Gallassi et al., "Bandwidth Assignment in Prioritized ATM Networks", Dec. 1990, pp. 505.2.1–505.2.5.

Jeffrey C. Mogul, "Eliminating Receive Livelock in an Interrupt–Driven Kernel", vol. 15, No. 3, Aug. 1997, pp. 217–252.

* cited by examiner

*Primary Examiner*—Duc Ho
(74) *Attorney, Agent, or Firm*—Wenderoth, Lind & Ponack, L.L.P.

(57) ABSTRACT

In a data transmission method of the present invention, not only when relay of input packets is performed but also transmission of a retransmission packet or a correction packet is performed, changes in an output rate due to output rate control is suppressed, and data transmission is efficiently performed according to a capacity of an output channel. A data transmission device comprises a packet priority decision unit 15 for deciding priorities of input packets, a retransmission packet, and an FEC packet, an output delay calculation unit 17 for calculating a delay time until data of the respective packets is reproduced by a receiving terminal, and an FEC packet generation unit 19 for generating an FEC packet containing an error correcting code which corresponds to a packet designated on the basis of the priorities of the respective packets. When transmission of the retransmission packet and the FEC packet together with the input packets is performed, lower priority packets corresponding to a size of packets which are additionally transmitted are thinned out.

10 Claims, 14 Drawing Sheets

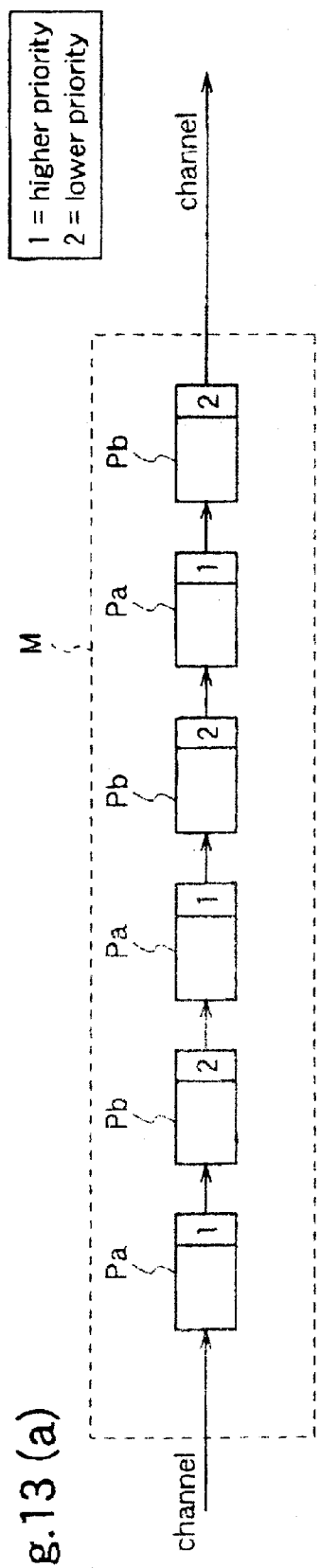
Fig.13 (a) Prior Art
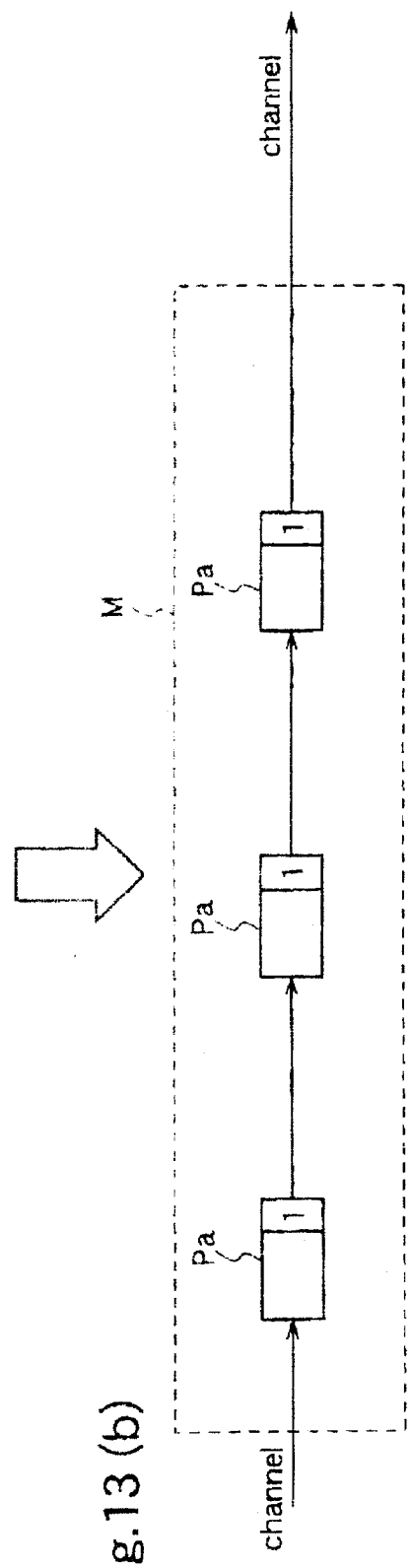
Fig.13 (b)

Prior Art
Fig.14 (a)  Fig.14 (b)
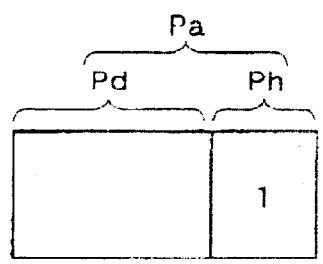
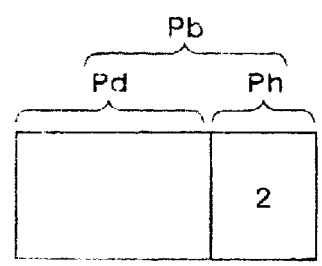
Fig.15 Prior Art
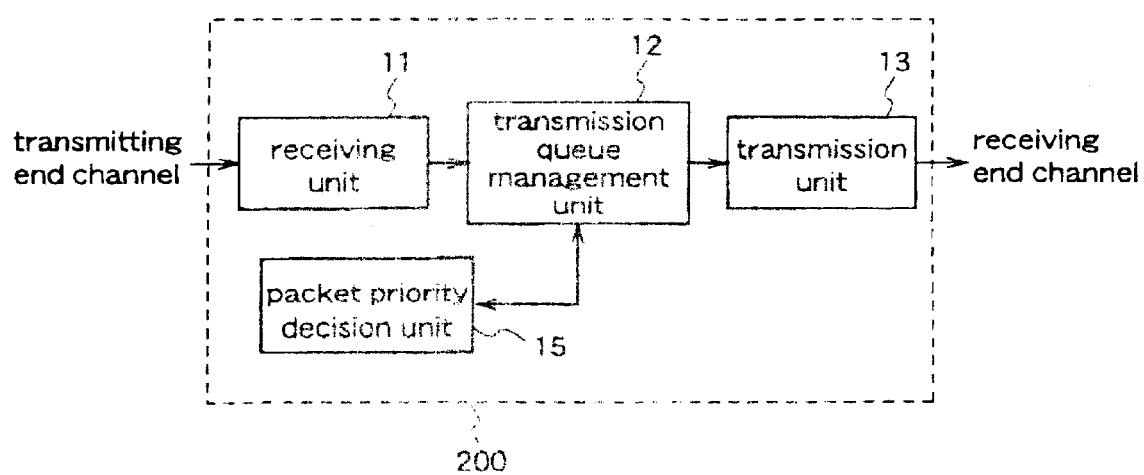

DATA TRANSMISSION METHOD

FIELD OF THE INVENTION

The present invention relates to a data transmission method and, more particularly, to a method for relaying packets which are successively input from a transmitting end, to output the same to a receiving terminal, as well as controlling an output rate.

BACKGROUND OF THE INVENTION

FIGS. 13(a) and 13(b) are diagrams for explaining a prior art data transmission method and showing processing in a relay server.

As shown in FIG. 13(a), a prior art relay server performs relay processing of receiving packets which are successively input from a transmitting end and successively outputting the received packets to a receiving terminal.

In this prior art relay server, when an input rate is higher with relative to a channel capacity at an output end, overflow occurs in a transmission queue M in the relay server. Accordingly, as shown in FIG. 13(b), on the basis of information about priorities attached to respective packets, the prior art relay server outputs only higher priority packets Pa having priorities of a predetermined value or higher, with thinning out lower priority packets Pb having priorities lower than the predetermined value.

Hereinafter, brief descriptions are given of data structures of the packets Pa and Pb, and a detailed construction of the data transmission device as a prior art relay server.

FIG. 14 are diagrams illustrating data structures of the packets.

Each of the packets Pa and Pb transmitted by the above-described transmission method comprises a data part Pd for storing digital data corresponding to a medium, such as a video image, a voice, and a character, and a header part Ph for storing relevant information indicating an attribute or the like of the digital data, as shown in FIGS. 14(a) and 14(b).

In the header part, information indicating a priority of data stored in the data part (hereinafter, simply referred to as a priority) are stored as one of the relevant information. For example, the packet Pa is a higher priority packet having a value "1" indicating that the priority is higher, stored in its header part Ph. The packet Pb is a lower priority packet having a value "2" indicating that the priority is lower, stored in its header part Ph.

In addition, FIG. 15 is a block diagram illustrating a structure of this data transmission device (relay server).

This data transmission device 200 constitutes a relay server for relaying transmission data between a distribution server (transmitting end) and a terminal (receiving end), and has a receiving unit 11 for receiving input packets which are transmitted from the distribution server, a transmission queue management unit 12 for setting an order of transmitting the received input packets on the basis of predetermined information, and a transmission unit 13 for transmitting the respective packets in the transmission order set by the management unit 12.

The transmission queue management unit 12 includes a transmission queue (not shown) as a data buffer for temporarily storing the input packets received by the receiving unit 11.

In addition, the data transmission device 200 has a packet priority decision unit 15 for deciding priorities of the input packets. In the transmission queue management unit 12, the transmission order is decided by thinning out lower priority packets in the transmission queue on the basis of the decided priorities and higher priority packets in the transmission queue are output to the transmission unit 13 in the decided order.

However, since the prior art relay server performs a simple output rate control of not transmitting lower priority packets but transmitting only higher priority packets, the output rate may be lower than required, or the output rate may be changed considerably with the output rate control.

In addition, occurrence of a transmission error on a channel cannot be avoided. In parenthesis, a bit error rate in a wired section is about $10^{-5}$ to $10^{-7}$ and a bit error rate in a wireless section is about $10^{-3}$. Particularly, in a data transmission method in which a reproduction quality depends on a transmission quality of end-to-end (between a distribution server and a receiving terminal), such as a RTP (Real-Time Transport Protocol) method, the transmission quality in a wireless section significantly influences the reproduced quality.

Accordingly, in order to recover the transmission error, the relay server retransmits a packet in accordance with a retransmission request from a receiving terminal end or transmits to a predetermined packet, a correction packet containing an error correcting code for correcting a data error of the packet. However, only with the transmission control according to the priorities of the input packets, when retransmission of a packet or transmission of a correction packet is performed, the output rate in the relay server increases and thereby the output rate exceeds a value corresponding to the channel capacity.

SUMMARY OF THE INVENTION

It is an object of the present invention to provide a data transmission method which can suppress changes in the output rate due to the output rate control, not only when relay of input packets is performed but also when transmission of a retransmission packet or a correction packet is performed, as well as perform transmission of packets efficiently according to the capacity of the output channel.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, a data transmission method for performing relay processing of relaying plural input packets which are successively input from a transmitting end, to output the same to a receiving terminal, as well as performing at least one processing of processing of retransmitting an input packet which is instructed to be retransmitted from the receiving terminal and processing of transmitting an correction packet containing an error correcting code for a predetermined input packet, comprises: decision processing of deciding a priority attached to each input packet from the transmitting end and priorities attached to at least one packet of the input packet which is instructed to be retransmitted and the correction packet; and output processing of outputting the input packets as well as outputting at least one packet of the input packet which is instructed to be retransmitted and the correction packet, and in the output processing, lower priority packets having priorities lower than a predetermined value, corresponding to a size of the input packet which is to be retransmitted or the correction packet which is to be transmitted, are thinned out. Therefore, not only when relaying of the input packets is performed but also when transmission of the retransmission packet or the correcting packet is performed, changes in an output rate can be suppressed, as well as data transmission can be performed efficiently according to a capacity of an output channel.

According to a 2nd aspect of the present invention, a data transmission method for relaying plural packets which are successively input from a transmitting end, to output the same to a receiving terminal, comprises: decision processing of deciding a priority attached to the respective packet; and rearrangement processing of rearranging the successively input packets, with a group comprising a predetermined number of packets as a process unit, such that the packets in each group are transmitted in the order of descending priorities, and in the rearrangement processing, a range of the packets in the respective group which are to be subjected to the rearrangement processing is decided such that all packets from a first input packet to a last input packet in the respective group are received by the receiving terminal in time for reproduction times. Therefore, there is an increase in a possibility of a retransmission request for a higher priority packet being issued prior to a time limit which is decided on the basis of a reproduction time in the receiving terminal (arrival time limit in the terminal).

According to a 3rd aspect of the present invention, a data transmission method for relaying plural packets which are successively input from a transmitting end, to output the same to a receiving terminal, comprises: decision processing of deciding a priority attached to the respective packet; and output processing of performing thinning-out processing for the plural packets to thin out part of the packets and outputting remaining packets, and in the output processing, the thinning-out processing is performed for plural packets having same priorities, which are input from the transmitting end, such that intervals between reproduction times of data corresponding to the respective plural packets received by the receiving terminal are equal. Therefore, at the receiving end, disorder in a reproduced image due to the thinning-out of packets can be suppressed.

According to a 4th aspect of the present invention, a data transmission method for relaying plural packets successively input from a transmitting end, to output the same to a receiving terminal, comprises: decision processing of deciding a priority attached to the respective packet; and output processing of performing thinning-out processing for the plural packets to thin out part of the packets and outputting remaining packets, and in the output processing, when lower priority packets having lower priorities, which lower priority packets are situated between two, i.e., former and latter higher priority packets having higher priorities, are to be thinned out from the plural packets, thinning-out is performed successively from a lower priority packet which is nearer to the latter higher priority packet among the two higher priority packets. Therefore, when data which is coded according to MPEG system is transmitted, omission of data which is referred to in decoding at the receiving end can be avoided, thereby preventing more degradation in an image quality than required due to the packet thinning-out processing.

According to a 5th aspect of the present invention, a data transmission method for relaying plural packets successively input from a transmitting end, to output the same to a receiving terminal, comprises: decision processing of deciding a priority attached to the respective packet; and output processing of performing thinning-out processing for the plural packets to thin out part of the packets and outputting remaining packets, and in the thinning-out processing in the output processing, plural packets having the same priorities are thinned out collectively. Therefore, when data which is coded according to MPEG system is transmitted, transmission of data which does not contribute toward keeping the image quality is avoided, whereby the transmission rate is efficiently reduced according to the image quality obtained at the receiving end.

According to a 6th aspect of the present invention, a data transmission method for relaying plural packets which are successively input from a transmitting end, to output the same to a receiving terminal, comprises: number decision processing of deciding a sequence numbers attached to the respective packet; priority decision processing of deciding a priority attached to the respective packet; and output processing of performing thinning-out processing for the plural packets to thin out part of the packets and outputting remaining packets, wherein in the thinning-out processing in the output processing, the sequence numbers of packets to be output are rewritten such that discontinuity in sequence numbers attached to the respective packets due to the thinning-out of packets does not occur. Therefore, adverse influences affecting on occurrence of a retransmission request or calculation of packet loss due to thinning-out of packets can be avoided.

According to a 7th aspect of the present invention, a data transmission method for relaying plural packets which are successively input from a transmitting end, to output the same to a receiving terminal, comprises: detection processing of detecting an error occurring rate on an output end channel; and when the error occurring rate is a predetermined rate or higher, performing at least one of repeat transmission processing of repeatedly outputting a predetermined packet, and correction packet transmission processing of transmitting a correction packet containing an error correcting code which corresponds to a predetermined packet. Therefore, recovery for communication errors can be performed in accordance with the reception state, together with the transmission rate control.

According to a 8th aspect of the present invention, the data transmission method of the 7th aspect comprises: decision processing of deciding a priority attached each of the respective packets which are successively input from the transmitting end; and performing, only to packets having priorities of a predetermined value or higher, at least one processing of the repeat transmission processing and the correction packet transmission processing. Therefore, transmission rate control according to a reception state can be performed as well as changes in the transmission rate due to the transmission rate control can be suppressed.

BRIEF DESCRIPTION OF THE DRAWINGS

FIG. 2(a) shows a state where input packets are stored in a transmission queue M of the data transmission device and FIG. 2(b) shows a state where an order of transmitting the packets in the transmission queue is set.

FIGS. 4(a) and (b) are diagrams schematically illustrating transmission rate control in the data transmission device of the second embodiment. FIG. 4(a) shows a state where input packets are stored in a transmission queue M in the data transmission device and FIG. 4(b) shows a state where the packets in the transmission queue M are rearranged.

FIG. 6(a) shows a state where input packets are stored in a transmission queue M in the data transmission device. FIG. 6(b) shows a state where thinning-out processing is performed for the packets in the transmission queue M in accordance with priorities. FIG. 6(c) shows a state where thinning-out processing is performed for the packets in the transmission queue M in accordance with time stamps.

FIG. 7(a) shows a state where input packets are stored in a transmission queue M in the data transmission device. FIG. 7(b) shows a state where a first thinning-out processing is performed in the transmission queue M. FIG. 7(c) shows a state where a second thinning-out processing is performed in the transmission queue M.

FIG. 8(a) shows a state where input packets are stored in a transmission queue M in the data transmission device. FIG. 8(b) shows a state where a first thinning-out processing is performed in the transmission queue M. FIG. 8(c) shows a state where a second thinning-out processing is performed in the transmission queue M.

FIG. 10(a) shows a state where input packets are stored in the transmission queue M in the data transmission device. FIG. 10(b) shows a state where processing of thinning out lower priority packets in the transmission queue M is performed. FIG. 10(c) shows a state where processing of rewriting the sequence numbers of the higher priority packets in the transmission queue M is performed.

FIG. 12(a) shows a state where input packets are stored in the transmission queue M in the data transmission device.

FIGS. 13(a) and (b) are diagrams illustrating transmission rate control in a prior art data transmission device. FIG. 13(a) shows a state where input packets are stored in a transmission queue M in a relay server and FIG. 13(b) shows a state where thinning-out processing is performed for packets in the transmission queue M in the relay server.

FIGS. 14(a) and (b) are diagrams for explaining data structures of the input packets. FIG. 14(a) shows a data structure of a higher priority packet and FIG. 14(b) shows a data structure of a lower priority packet.

FIG. 15 is a block diagram illustrating a priori art data transmission device for relaying packets by a prior art data transmission method.

DETAILED DESCRIPTION OF THE PREFERRED EMBODIMENTS

Hereinafter, embodiments of the present invention will be described.

(Embodiment 1.)

A data transmission method according to a first embodiment of the present invention performs, for input packets from a transmitting end, and an input packet instructed to be retransmitted (retransmission packet) and a correction packet (FEC packet) containing an error correcting code, decision of priorities attached to the respective packets and transmits only packets having priorities of a predetermined value or higher.

Figure 1:
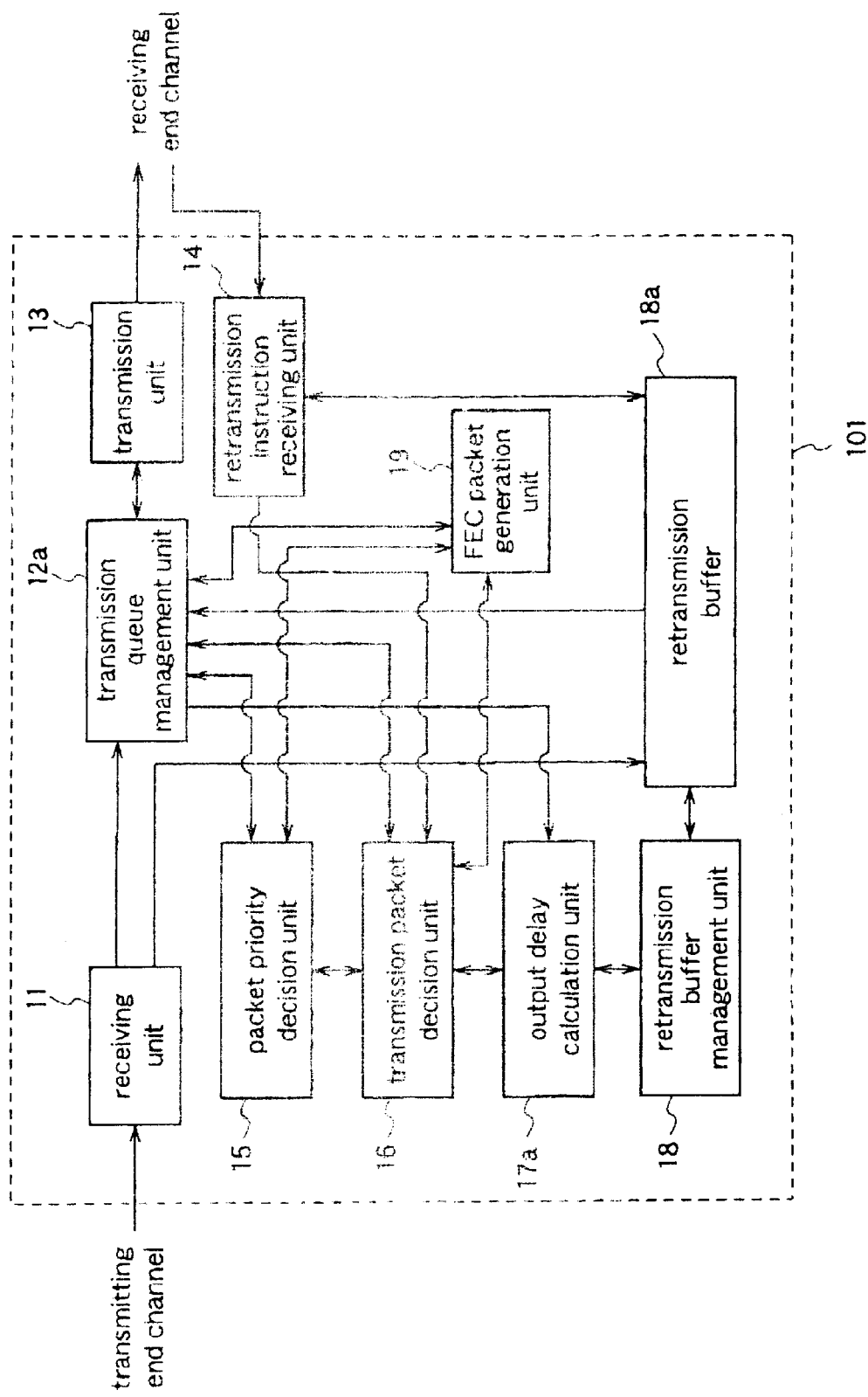
FIG. 1 is a block diagram illustrating a data transmission device according to a first embodiment of the present invention.

FIG. 1 is a block diagram illustrating the data transmission device according to the first embodiment.

A data transmission device 101 of the first embodiment constitutes a relay server for relaying transmission data between a distribution server (transmitting end) and a terminal (receiving end).

This data transmission device 101 has a receiving unit 11 for receiving input packets transmitted from the distribution server, a transmission queue management unit 12a for setting an order of transmitting the received input packets, a packet to be retransmitted (retransmission packet), and an FEC (Forward Error Correction) packet (correction packet) containing an error correcting code, on the basis of predetermined information, and a transmission unit 13 for transmitting the respective packets in the transmission order set by the management unit 12a.

The transmission queue management unit 12a includes a transmission queue (not shown) as a data buffer for temporarily storing the input packets received by the receiving unit 11.

Further, the data transmission device 101 has a retransmission buffer 18a for storing a predetermined input packet as a retransmission packet, a packet priority decision unit 15 for deciding priorities of the input packets, the retransmission packet, and the FEC packet, and a retransmission buffer management unit 18 for controlling the retransmission buffer 18a on the basis of the decided priorities of the packets such that data of packets having priorities of a predetermined value or higher are stored in the buffer 18a.

Further, the data transmission device 101 has a retransmission instruction receiving unit 14 for receiving an instruction to request retransmission of a packet from the receiving terminal, and an FEC packet generation unit 19 for generating an FEC packet (correcting packet) containing an error correcting code which corresponds to a packet designated on the basis of the priorities of the respective packets.

Further, the data transmission device 101 has an output delay calculation unit 17a for calculating, on the basis of the transmission order information of each packet from the transmission queue management unit 12a, a delay time until data of each packet in the transmission queue management unit 12a is reproduced by the receiving terminal (reproduction delay time), and a transmission packet decision unit 16 for deciding a packet to be transmitted, on the basis of the retransmission request from the receiving end, the priority information of each packet, and the reproduction delay time of each packet, and thereby the decision by the decision unit 16 is output to the transmission queue management unit 12a as predetermined information.

Next, functions and effects will be described.

FIGS. 2(a), 2(b), and 2(c) are diagrams schematically illustrating transmission rate control in the data transmission device of the first embodiment. FIG. 2(a) shows a state where packets (input packets) transmitted by the distribution server are stored in the transmission queue M in the relay server (data transmission device) 101. FIG. 2(b) shows a state where the transmission order of the packets in the transmission queue M in the relay server is set.

In the data transmission method of the first embodiment, when transmission of a retransmission packet Pr and an FEC packet Pfec is performed together with transmission of input packets Pa and Pb, lower priority packets Pb corresponding to a size of these packets to be transmitted are thinned out, thereby suppressing changes in the output rate.

Figure 2:
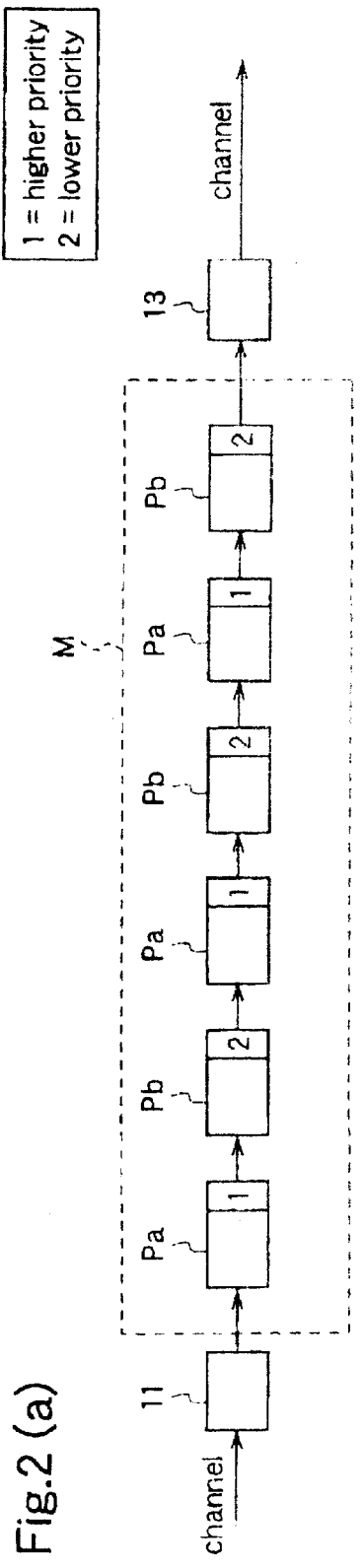
FIGS. 2(a) and 2(b) are diagrams schematically illustrating transmission rate control in the data transmission device of the first embodiment.
FIG. 2(c) shows a data structure of a retransmission packet and FIG. 2(d) shows a data structure of an FEC packet.
Figure 2:
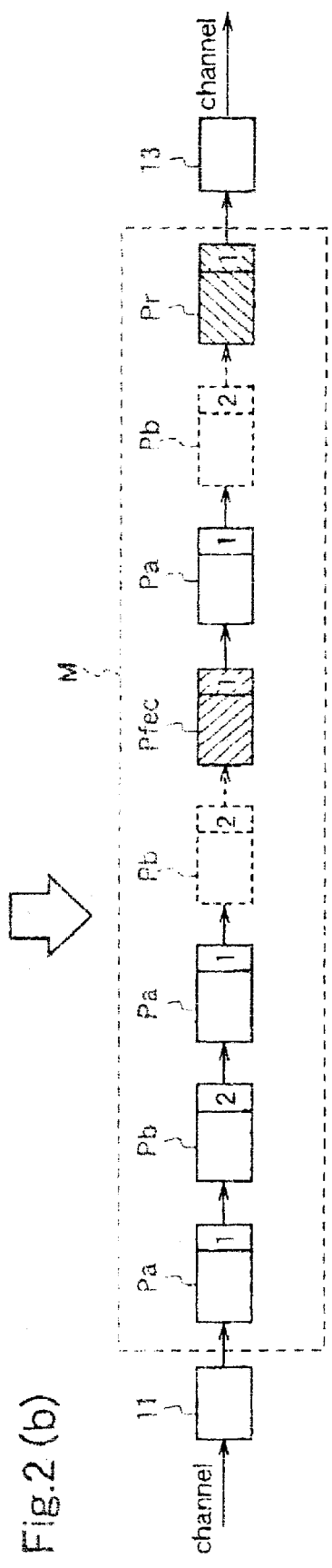
Figure 2:
Figure 2:
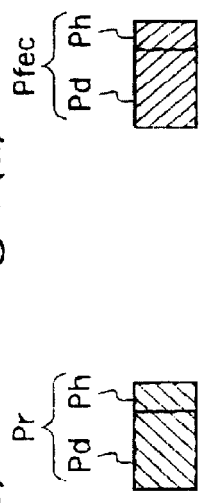

Here, each packet transmitted from the distribution server, i.e., each of higher priority packets Pa and lower priority packets Pb comprises a data part Pd for storing digital data which corresponds to a medium, such as a video image, a voice, and a character, and a header part Ph for storing relevant information indicating an attribute of the digital data, as shown in FIGS. 14(a) and (b). In addition, each of the retransmission packet Pr and the FEC packet Pfec also comprises a data part Pd for storing digital data and a header part Ph for storing relevant information indicating an attribute of the digital data, as shown in FIGS. 2(c) and (d), like the packets Pa and Pb. In this case, in the header part Ph in the packet, additional information concerning a sequence number and a priority and the like is stored as the relevant information. However, only values of priority information are shown in FIG. 2, with a value corresponding to a higher priority as "1" and a value corresponding to a lower priority as "2".

Hereinafter, an operation of the data transmission device 101 will be briefly described.

In the data transmission device 101 as the relay server, the received input packets Pa and Pb are supplied to the transmission queue management unit 12a as well as to the retransmission buffer 18a. In addition, to the transmission queue management unit 12a, a retransmission packet Pr corresponding to an input packet to which a retransmission request is issued from the receiving terminal end is supplied from the retransmission buffer 18a, as well as a correction packet Pfec corresponding to a predetermined input packet is supplied from the FEC packet generation unit 19.

At this time, a priority of respective packet in the transmission queue M in the transmission queue management unit 12a is decided by the packet priority decision unit 15 as well as a reproduction delay time of the respective packet is calculated by the output delay calculation unit 17a, and the decided priority and reproduction delay time which correspond to the respective packet are output to the transmission packet decision unit 16. In addition, in the transmission packet decision unit 16, on the basis of the priorities of the input packets Pa and Pb and the retransmission packet Pr, an instruction as for whether an FEC packet (correction packet) Pfec containing an error correcting code for these packets is generated or not is output to the FEC packet generation unit 19.

Then, when transmission of the retransmission packet Pr and the FEC packet Pfec is performed together with the transmission of the input packets Pa and Pb, the transmission packet decision unit 16 instructs the transmission queue management unit 12a to thin out lower priority packets corresponding to a size of the retransmission packet and the FEC packet which are to be transmitted. In the management unit 12a, the transmission order of the packets is set on the basis of this instruction (see FIG. 2(b)). In the transmission unit 13, processing of transmitting the input packets, the retransmission packet, and the FEC packet to the receiving terminal in the set transmission order is performed.

Here, in the retransmission buffer 18a, with the control by the retransmission buffer management unit 18, the input packets are stored in the retransmission buffer 18a as retransmission packets and data of packets which will be late for the reproduction times are successively freed (abandoned) by the management unit 18.

As described above, in the first embodiment, when the transmission of the retransmission packet Pr and the FEC packet Pfec is performed together with the transmission of the input packets Pa and Pb, lower priority packets Pb corresponding to the size of these packets to be transmitted are thinned out. Therefore, not only when the relay of the input packets is performed but also when the transmission of the retransmission packet and the correction packet is performed, changes in the output rate can be suggested and further the data transmission can be efficiently performed according to the capacity of the output channel.

In this first embodiment, when the transmission of the retransmission packet and the FEC packet is performed together with the transmission of the input packets, lower priority packets corresponding to the size of these packets to be transmitted are thinned out. However, when it is decided that a predetermined retransmission packet and FEC packet are transmitted and then a packet having a long reproduction delay time (i.e., a packet which will be late for the reproduction time at the receiving end) arises from that decision, transmission of lower priority packets having priorities lower than the priorities of the retransmission packet and the FEC packet can be stopped.

Further, the data transmission device of the first embodiment performs transmission of the retransmission packet and the FEC packet together with the transmission of the input packets. However, the data transmission device can perform the relay processing of relaying input packets which are successively input from the distribution server (transmitting end) to output the same to the receiving terminal, as well as performs only one of the retransmission of an input packet which a retransmission instruction is issued from the receiving terminal and the transmission of a correction packet containing an error correcting code which corresponds to a predetermined input packet.

(Embodiment 2.)

A data transmission method according to a second embodiment of the present invention includes rearrangement processing of rearranging successively input packets, with a group comprising a predetermined number of packets as a process unit, such that packets in the respective group are transmitted in the order of descending priorities, and in the rearrangement processing, a range of the packets in the respective group, which are to be subjected to the rearrangement processing is decided such that all packets from a first input packet to a last input packet in the respective group are received by the receiving terminal in time for reproduction times.

Figure 3:
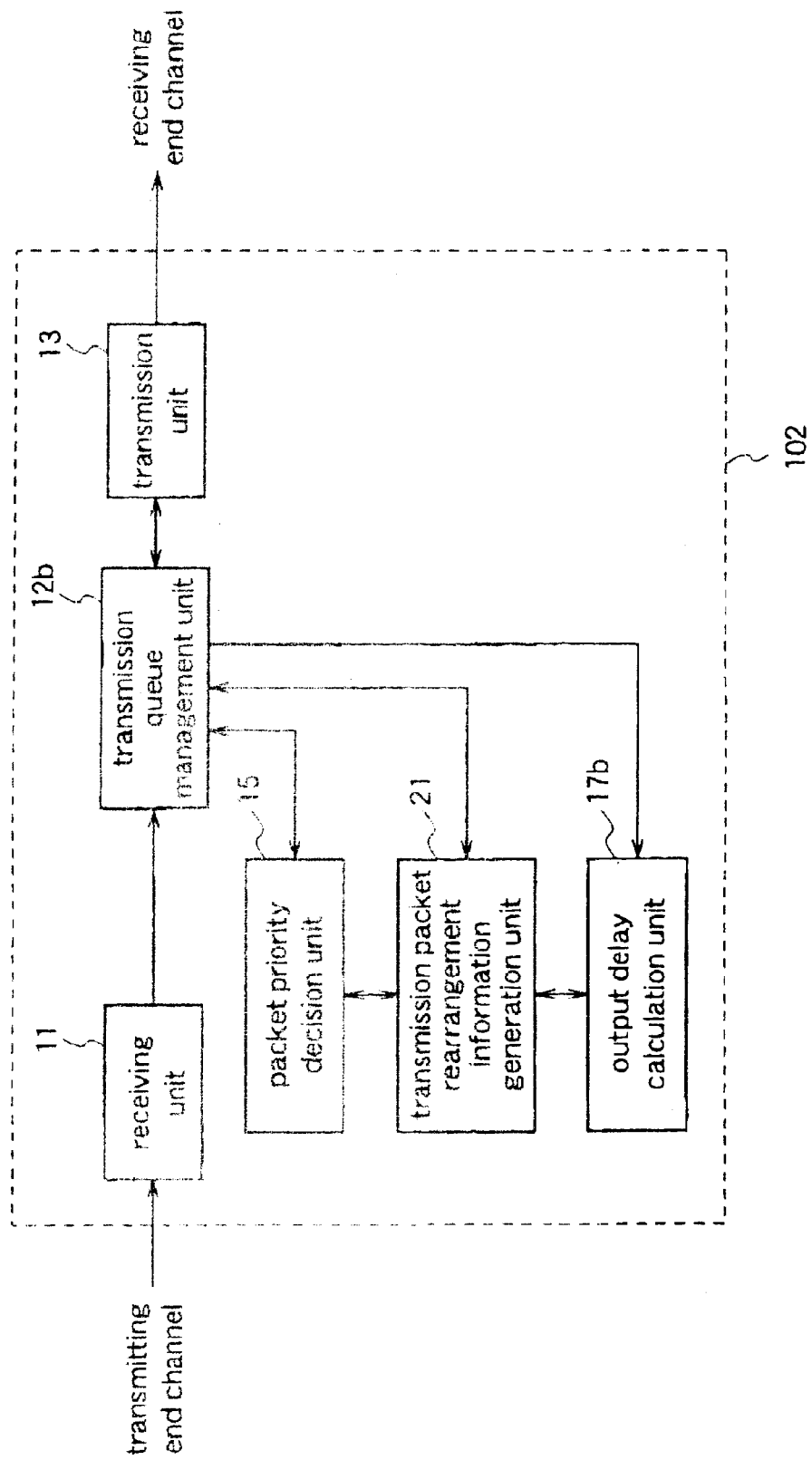
FIG. 3 is a block diagram illustrating a data transmission device according to a second embodiment of the present invention.

FIG. 3 is a block diagram illustrating the data transmission device according to the second embodiment.

A data transmission device 102 of the second embodiment constitutes a relay server for relaying transmission data between a distribution server (transmitting end) and a terminal (receiving end). This data transmission device 102 of the second embodiment has, like the data transmission device 101 of the first embodiment, a receiving unit 11 for receiving input packets transmitted from the distribution server, a transmission queue management unit 12b for setting a transmission order of the received input packets on the basis of predetermined information, and a transmission unit 13 for transmitting the respective packets in the transmission order set by the management unit 12b.

Further, the data transmission device 102 has a packet priority decision unit 15 for deciding priorities of the input packets, an output delay calculation unit 12b for calculating, on the basis of transmission order information of each packet from the transmission queue management unit 12b, a delay time until data of each packet in the transmission queue management unit 12b is reproduced by the receiving terminal (reproduction delay time), and a transmission packet rearrangement information generation unit 21 for generating rearrangement information for changing a transmission order of plural packets included in each group (unit for the rearrangement processing) in the transmission queue management unit 12b on the basis of the priorities and the delay times of the respective input packets.

Here, the transmission queue management unit 12b has a transmission queue (not shown) as a data buffer for temporarily storing the input packets received by the receiving unit 11 and rearranges the input packets in the transmission queue so as to be transmitted in the transmission order set by the transmission packet rearrangement information generation unit 21.

Next, functions and effects will be described.

Figure 4:
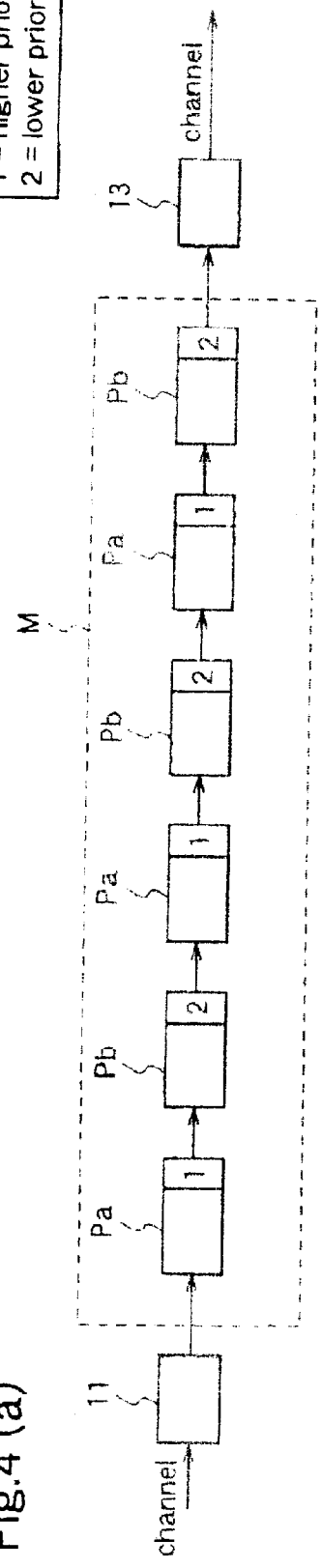
Figure 4:
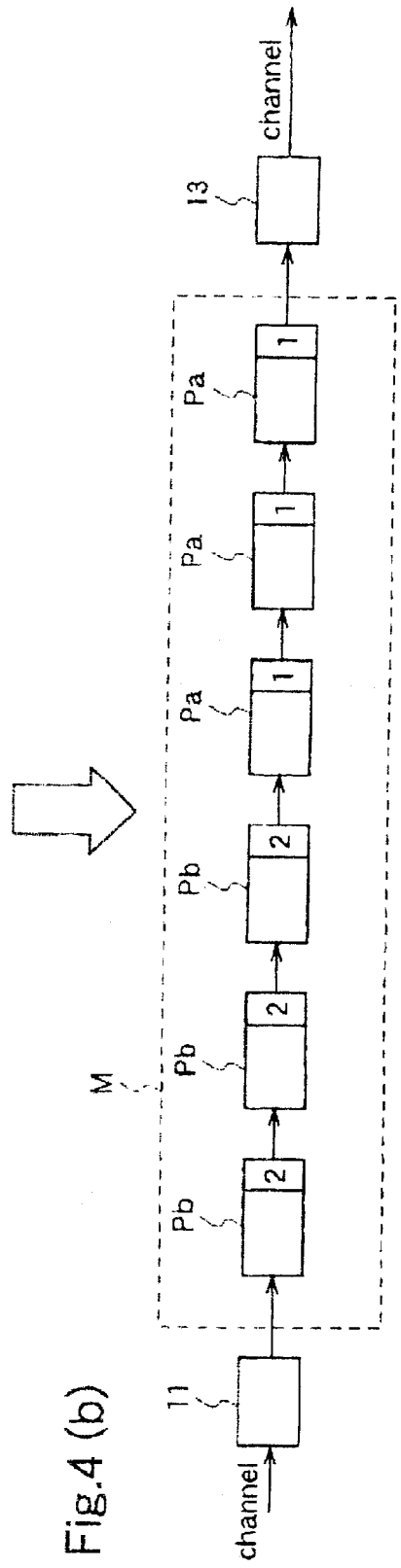

FIG. 4 are diagrams schematically illustrating transmission rate control in the data transmission device of the second embodiment. FIG. 4(*a*) show a state where packets (input packets) transmitted from the distribution server are stored in the transmission queue M in the relay server (data transmission device) 102. FIG. 4(*b*) shows a state where the packets in the transmission queue M in the relay server are rearranged.

As shown in FIG. 4(*a*), when lower priority packets Pb and higher priority packets Pa are alternately input to the data transmission device 102 as a relay server, the receiving unit 11 receives these input packets and outputs the same to the transmission queue management unit 12b. At this time, priorities of the input packets in the transmission queue management unit 12b are decided by the packet priority decision unit 15, and the reproduction delay times of these input packets (delay times until the input packets are reproduced by the receiving terminal) are calculated by the output delay calculation unit 17b.

Then, by the transmission packet rearrangement information generation unit 21, rearrangement processing is performed for a predetermined number of packets in the transmission queue management unit 12b, which can be transmitted in time for the reproduction times, such that higher priority packets are transmitted prior to lower priority packets and thereby the transmission order is set. Here, the number of packets which can be transmitted in time for the reproduction times comprise plural packets constituting a group as a unit for the rearrangement processing. As shown in FIG. 4(*b*), rearrangement of the packets is performed by the transmission queue management unit 12b on the basis of the transmission order set as described above. The rearranged input packets are successively transmitted by the transmission unit 13 to the receiving terminal end.

As described above, in the data transmission method of the second embodiment, the processing of rearranging packets which are successively input from the transmitting end such that the respective packets are transmitted in the order of descending priorities of the packets is performed such that all packets after this rearrangement can be transmitted in time for the reproduction times in the receiving terminal. Therefore, higher priority packets are preferentially transmitted prior to lower priority packets such that the reproduction delay times of the packets are shorter, i.e., such that the packets will be well in time for the reproduction time. This increases a possibility of a retransmission request for a higher priority packet being issued prior to a time limit which is decided on the basis of the reproduction time at the receiving terminal (arrival time limit at the terminal).

In the second embodiment, the method for merely rearranging input packets on the basis of the priorities is shown. However, rearrangement of the input packets can be performed within a channel (i.e., a medium such as a video image, a voice, or a character) or can be performed between different channels.

For example, when input packets are rearranged within a channel, the receiving terminal and can compile packets corresponding to the channel on the basis of the sequence numbers and thereby reconstruct data.

In addition, when input packets are rearranged between different channels, the receiving terminal end can compile packets corresponding to a channel on the basis of a channel number attached to a header of RTP and a sequence number of each packet and thereby reconstruct data of the channel.

Further, in the second embodiment, the processing of rearranging packets which are successively input from the transmitting end such that the respective packets are transmitted in the order of descending priorities is performed for each of the packets within such a range that all packets subjected to this rearrangement processing can be received by the receiving terminal in time for the reproduction times. However, the transmission control according to the second embodiment can be performed not only for the transmission of packets which are input successively from the transmitting end but also for at least one of the retransmission of a packet and the transmission of an FEC packet in the first embodiment, and for a repeat transmission of a packet.
(Embodiment 3.)

When input packets are thinned out successively from an input packet at the head in a packet buffer (transmission queue) for managing the transmission order, data reproduction is interrupted for a long time. In order to solve this problem, a data transmission method according to a third embodiment of the present invention performs packet thinning-out processing for input packets having the same priorities such that intervals between reproduction times of data corresponding to respective packets are equal at the receiving end.

Figure 5:
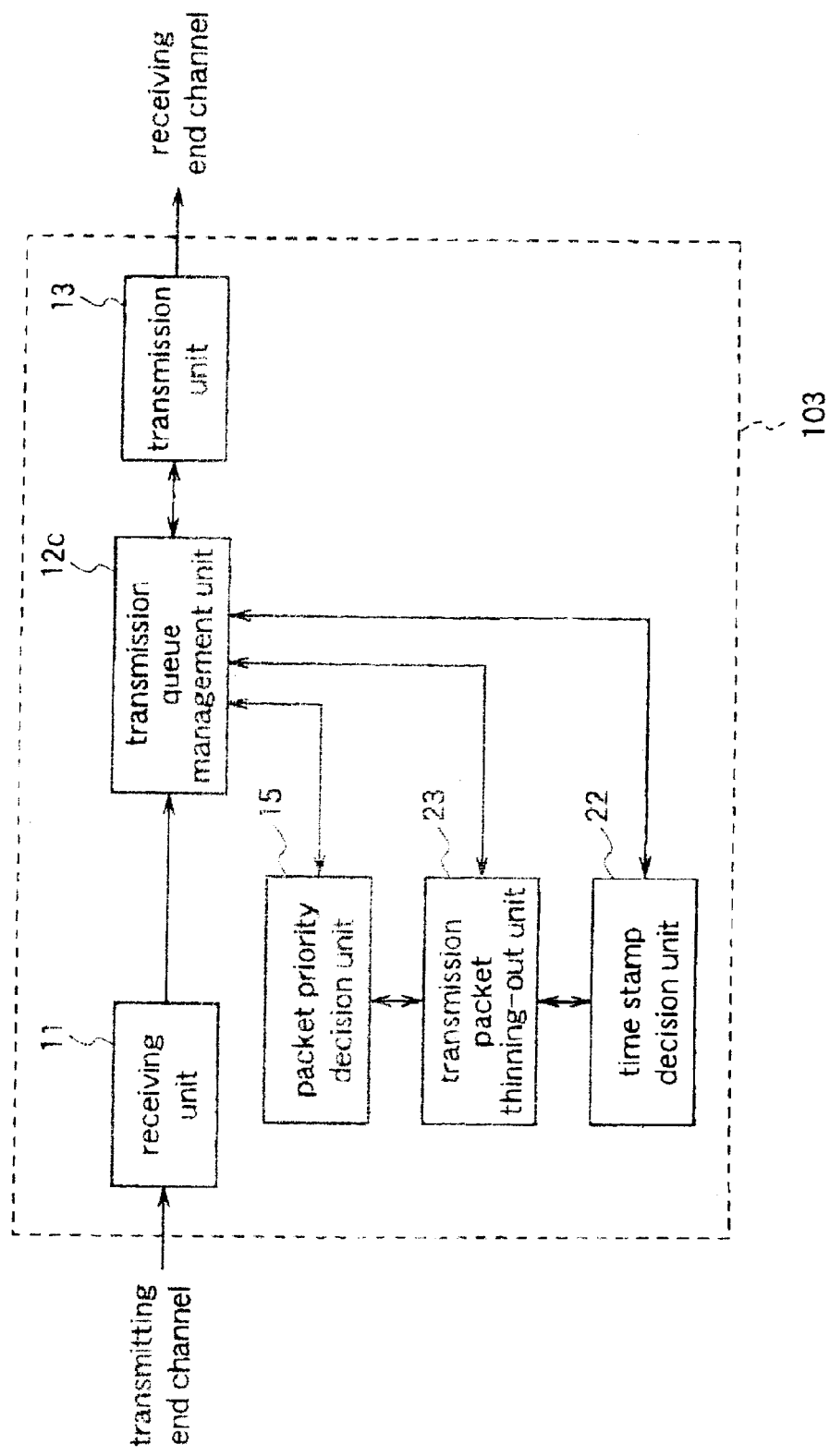
FIG. 5 is a block diagram illustrating a data transmission device according to a third embodiment of the present invention.

FIG. 5 is a block diagram illustrating the data transmission device according to the third embodiment.

The data transmission device 103 of the third embodiment constitutes, like the data transmission devices of the first and second embodiments, a relay server for relaying transmission data between a distribution server (transmitting end) and a terminal (receiving end). This data transmission device 103 of the third embodiment has a receiving unit 11 for receiving input packets which are transmitted from the distribution server, a transmission queue management unit 12c for setting a transmission order of the received input packets on the basis of predetermined information, and a transmission unit 13 for transmitting the respective packets in the transmission order set by the management unit 12c.

Further, the data transmission device 103 has a packet priority decision unit 15 for deciding priorities of the input packets, a time stamp decision unit 22 for deciding a time stamp as time information which is attached to each packet in the transmission queue management unit 12c, and a transmission packet thinning-out unit 23 for deciding packets to be thinned out in the transmission queue management unit 12c, on the basis of the decided time stamp and priorities. Here, the time stamp is one of the relevant information stored in the header part of the packet.

In addition, the transmission queue management unit 12c has a transmission queue (not shown) as a data buffer for temporarily storing the input packets received by the receiving unit 11, and performs packet thinning-out processing for input packets having the same priorities in the transmission queue, on the basis of the decision output from the transmission packet thinning-out unit 23, such that intervals between reproduction times of data which corresponds to the respective packets are equal at the receiving end.

Next, functions and effects will be described.

Figure 6:
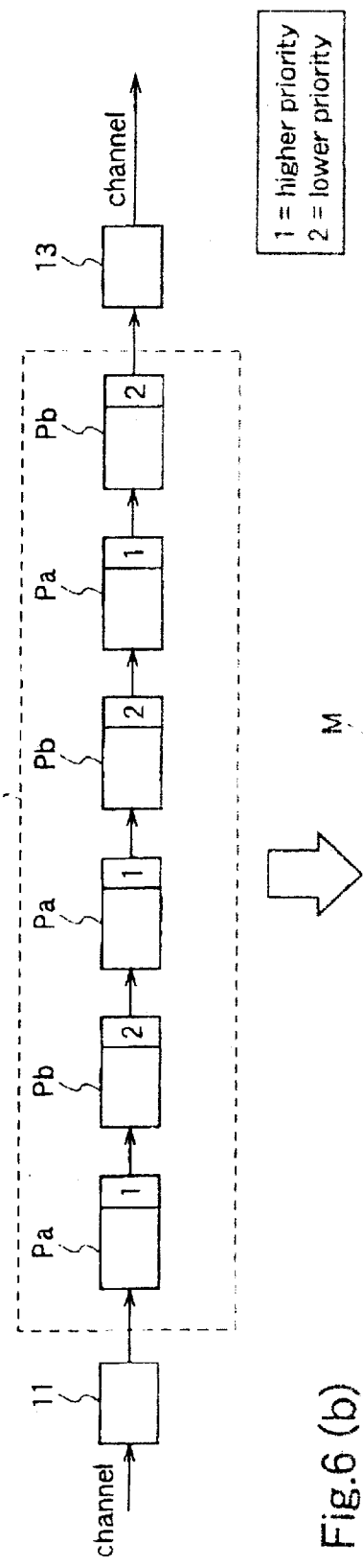
FIGS. 6(a)–6(c) are diagrams schematically illustrating transmission rate control in the data transmission device of the third embodiment.
Figure 6:
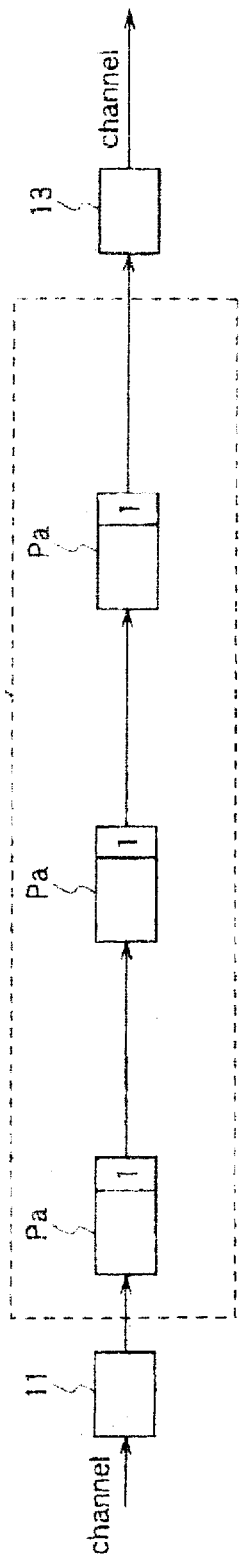
Figure 6:
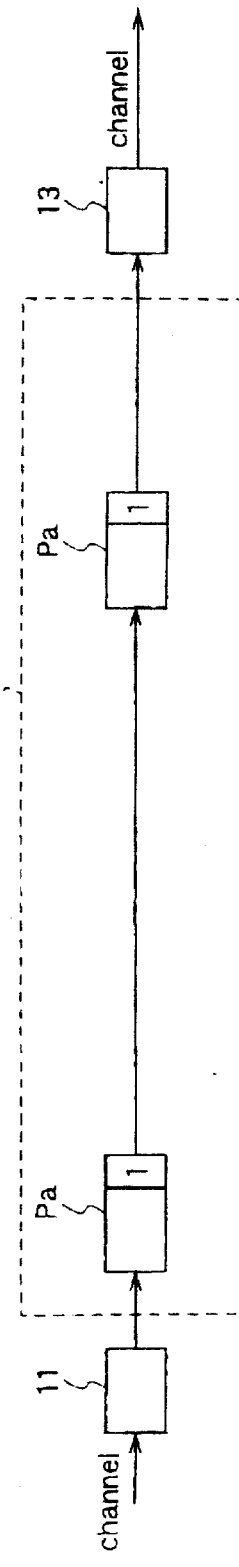

FIG. 6 are diagrams schematically illustrating transmission rate control in the data transmission device of the third embodiment. FIG. 6(a) shows a state where packets (input packets) transmitted from the distribution server are stored in the transmission queue M in the relay server (data transmission device) 103. FIG. 6(b) shows a state where the packets in the transmission queue M in the relay server are thinned out in accordance with the priorities. FIG. 6(c) shows a state where the packets in the transmission queue M in the relay server are thinned out in accordance with the time stamps.

While only priorities are shown in FIGS. 6 as the relevant information stored in the header parts of the respective packets, time stamps are also stored in the header parts of actual packets together with other relevant information.

As shown in FIG. 6(a), when lower priority packets Pb and higher priority packets Pa are alternately input to the data transmission device 103 as a relay server, the receiving unit 11 receives these input packets and outputs the same to the transmission queue management unit 12c.

At this time, priorities of the input packets in the transmission queue management unit 12c are decided by the packet priority decision unit 15 and time stamps of the input packets in the transmission queue management unit 12 are decided by the time stamp decision unit 22. Then, packets to be thinned out in the transmission queue management unit 12c are decided by the transmission packet thinning-out unit 23, on the basis of the decided time stamps and priorities.

Then, in the transmission queue management unit 12c, as shown in FIG. 6(b), processing of thinning out lower priority packets Pb is performed on the basis of the decision output from the transmission packet thinning-out unit 23. Further, as shown in FIG. 6(c), processing of thinning out packets is performed for the input packets Pa having the same priorities, on the basis of the decision output from the transmission packet thinning-out unit 23, such that intervals between reproduction times of data which corresponds to respective packets are equal at the receiving end. Thereby, packets are transmitted from the transmission unit 13 so as to have the equal intervals between the reproduction times of data corresponding to the respective packets at the receiving end.

In this third embodiment, when packets having the same priorities are to be thinned out, the packets are thinned out so as to have the equal intervals between the reproduction times. Therefore, at the receiving end, disorder in reproduced images due to the thinning-out of packets can be suppressed.

To be specific, when input packets are thinned out successively from an input packet at the head in the packet buffer (transmission queue) for managing the transmission order, on the basis of the priorities of the packets, there is a problem that the data reproduction is interrupted for a long time. However, in this embodiment, the packet thinning-out processing is performed for the input packets having the same priorities such that intervals between the reproduction times of the data which corresponds to the respective packets are equal at the receiving end, whereby long time interruption of the data reproduction at the receiving end is avoided and the disorder in the reproduced image is suppressed.

In this third embodiment, the packet thinning-out processing is performed for input packets having the same priorities such that intervals between the reproduction times of data corresponding to the respective packets are equal at the receiving end. However, the transmission control according to this third embodiment can be performed not only for the transmission of packets successively input from the transmitting end but also for at least one of the retransmission of a packet and the transmission of an FEC packet in the first embodiment, and repeat transmission of a packet.

In addition, in the third embodiment, all lower priority packets having lower priorities are simultaneously thinned out from the input packets in the transmission queue. However, the packet thinning-out processing can be performed in another way.

For example, lower priority packets in the transmission queue in the relay server can be thinned out in stages according to busyness in a data communication on a channel (network) at the receiving end.

Further, in a data transmission device for transmitting a retransmission packet in accordance with a retransmission request like the data transmission device in the first embodiment, lower priority packets in the transmission queue in the relay server can be thinned out in stages according to the transmission state of the retransmission packet.

(Variation 1 of Embodiment 3.)

Hereinafter, as a variation 1 of the third embodiment, a brief description will be given of packet thinning-out processing of thinning out lower priority packets in the transmission queue in the relay server in stages.

Figure 7:
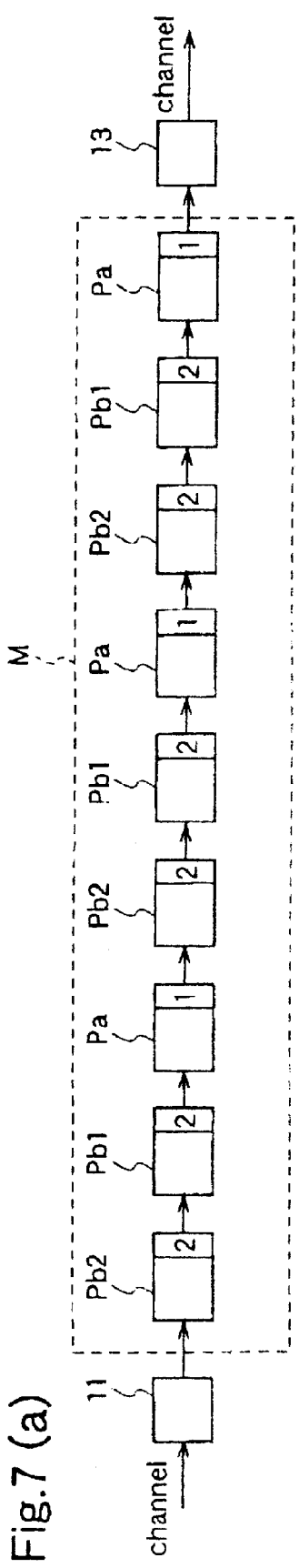
FIGS. 7(a)–7(c) are diagrams schematically illustrating transmission rate control in a data transmission device according to a variation 1 of the third embodiment.
Figure 7:
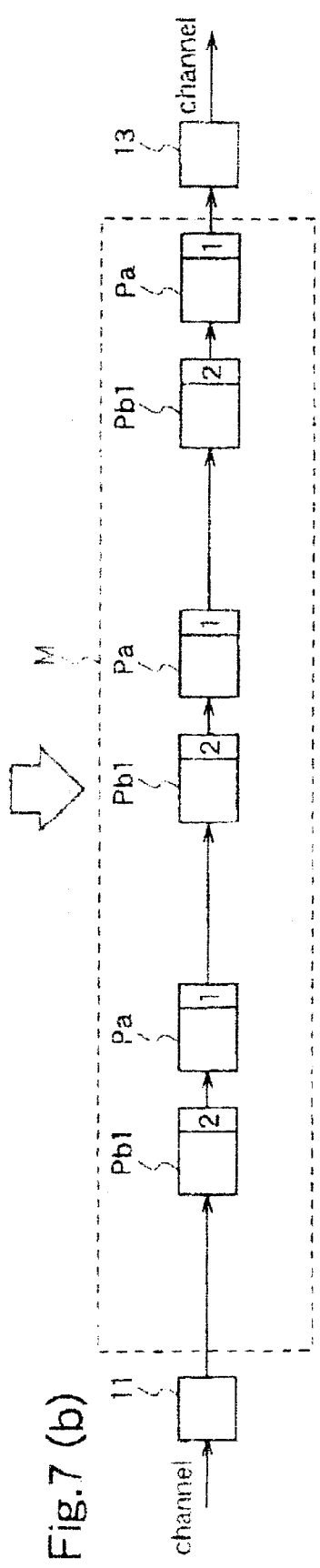
Figure 7:
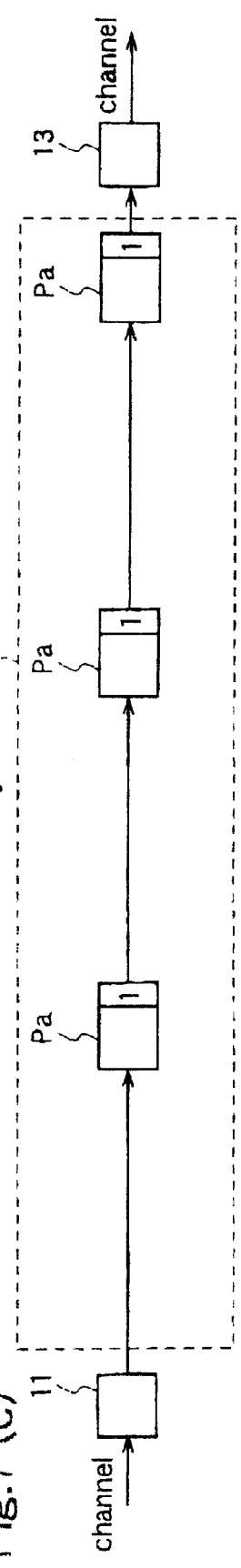

FIGS. 7(a)–(c) are diagrams schematically illustrating transmission rate control in a data transmission device according to the variation 1 of the third embodiment. FIG. 7(a) shows a state where packets (input packets) transmitted from the distribution server are stored in the transmission queue M in the relay server (data transmission device). FIG. 7(b) shows a state where a first thinning-out processing is performed in the transmission queue M in the relay server. FIG. 7(c) shows a state where a second thinning-out processing is performed in the transmission queue M in the relay server.

Here, transmission of packets from the distribution server is performed such that a higher priority packet Pa, a first lower priority packet Pb1, and a second lower priority packet and Pb2 are repeatedly received by the relay server.

In addition, the higher priority packet Pa is one containing image data of a frame which is subjected to intra frame coding according to MPEG (Moving Picture Expert Group) system. Each of the first and second lower priority packets Pb1 and Pb2 is one containing image data of a frame which is subjected to inter frame coding according to MPEG system. That is, the image data of the first lower priority packet Pb1 is subjected to coding processing with referring to the image data of the forward higher priority packet Pa and the image data of the second lower priority packet Pb2 is subjected to coding processing with referring to the image data of the forward first lower priority packet Pb1.

In the data transmission device (relay server) according to the variation 1 of the third embodiment, when the network at the receiving end becomes busier, the first thinning-out processing of thinning out the second lower priority packets Pb2 which are situated just before the higher priority packets Pa is performed in the transmission queue M in the relay server (see FIG. 7(b)), and the higher priority packets Pa and the first lower priority packets Pb1 are transmitted to the receiving end by the transmission unit 13.

Then, when the network at the receiving end becomes further busier, in addition to the first thinning-out processing, the second thinning-out processing of thinning out the first lower priority packets Pb1 which are situated just before the second lower priority packets Pb2 is performed in the transmission queue M in the relay server (see FIG. 7(c)), and only the higher priority packets Pa are transmitted to the receiving end by the transmission unit 13.

Thus, in the variation 1 of the third embodiment, according to the busyness state of the network, lower priority packets containing the image data of frames which are subjected to the inter frame coding are thinned out in stages in the transmission queue in the relay server, starting from the packets just before the higher priority packets containing the image data of frames which are subjected to the intra frame coding. Therefore, when data which is coded according to MPEG system is transmitted, more degradation in an image quality due to the packet thinning-out processing than required can be reduced to the minimum.

(Variation 2 of Embodiment 3.)

Further, as a variation 2 of the third embodiment, a brief description is given of packet thinning-out processing of thinning out packets in the transmission queue in the relay server in stages on the basis of the time stamps.

Figure 8:
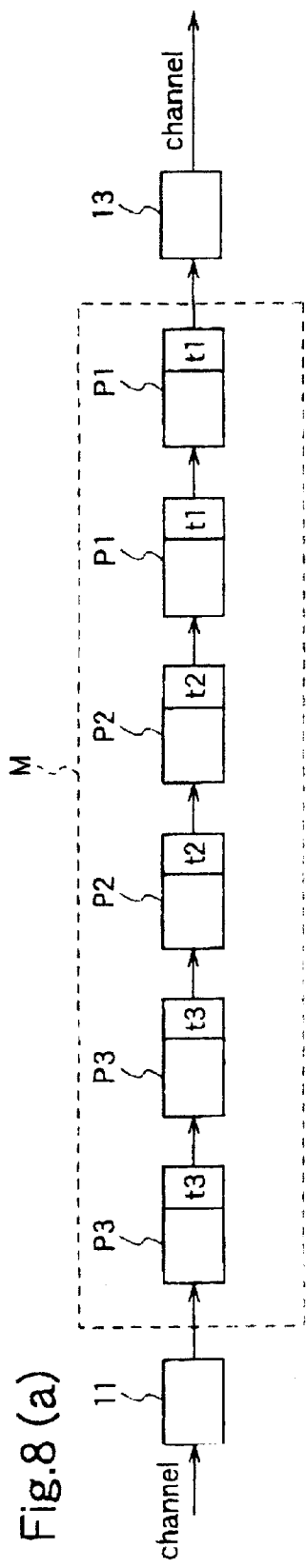
FIGS. 8(a)–8(c) are diagrams schematically illustrating transmission rate control in a data transmission device according to a variation 2 of the third embodiment.
Figure 8:
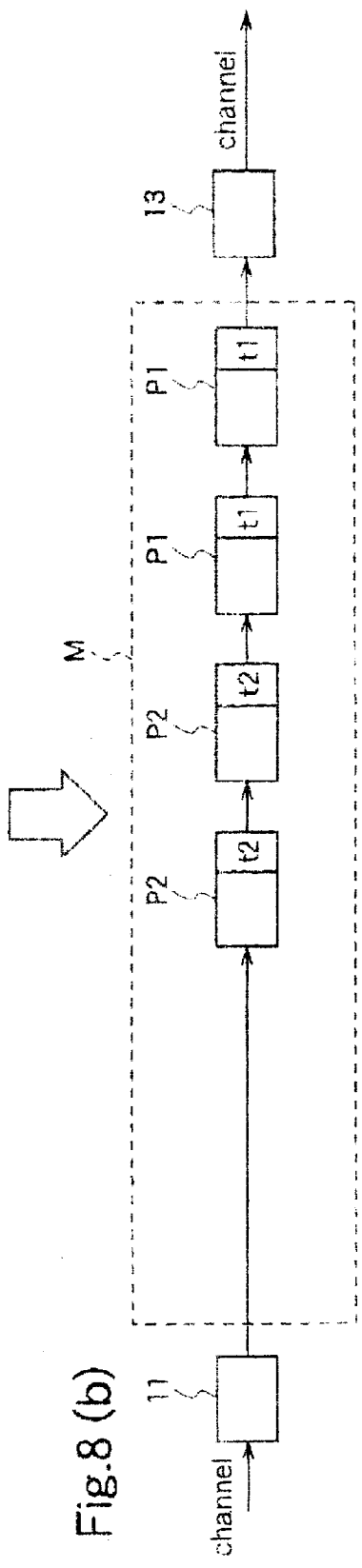
Figure 8:
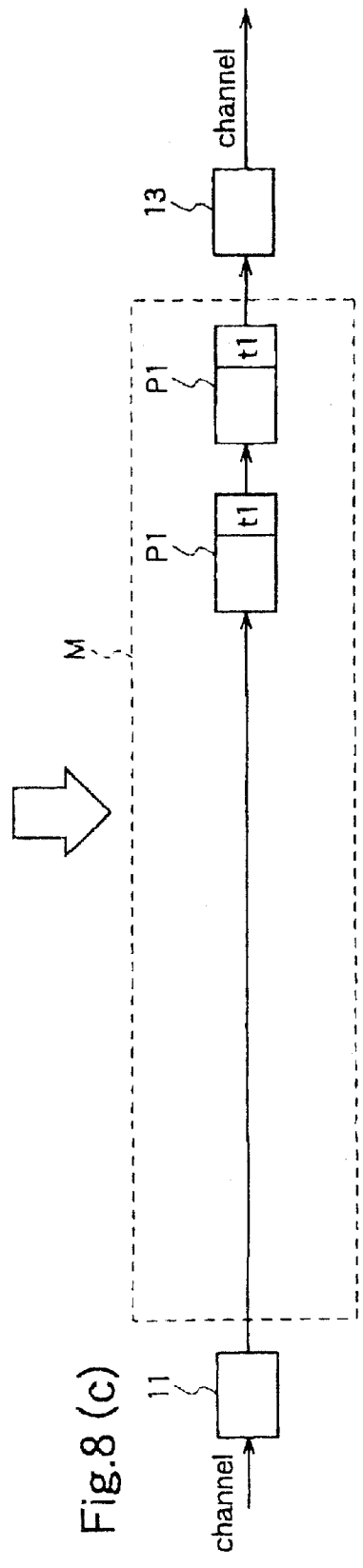

FIG. 8 are diagrams schematically illustrating transmission rate control in the transmission device according to the variation 2 of the third embodiment. FIG. 8(a) shows a state where packets (input packets) transmitted from the distribution server are stored in the transmission queue M in the relay server (data transmission device). FIG. 8(b) shows a state where a first thinning-out processing is performed in the transmission queue M in the relay server. FIG. 8(c) shows a state where a second thinning-out processing is performed in the transmission queue M in the relay server.

In this case, plural groups of packets are transmitted from the distribution server. One group corresponds to one frame and comprises plural packets. Therefore, packets in one group have image data of the same frame stored in the data part and the same time stamp (reproduction time) stored in the header part. For example, a packet P1 is a packet constituting a first group and has a time stamp indicating a reproduction time t1 stored in the header part. Similarly, packets P2 and P3 are packets constituting second and third groups, respectively, and have time stamps indicating reproduction times t2 and t3 stored in the header parts. Further in this case, the packet P1 is a higher priority packet, the packet P2 is a medium priority packet, and the packet P3 is a lower priority packet, each having information (not shown) indicating the priority stored in the header part.

In the data transmission device (relay server) according to the variation 2 of the third embodiment, when the network at the receiving end becomes busier, the first thinning-out processing of thinning out all the packets P3 of the third group having the lowest priorities, is performed in the transmission queue M in the relay server (see FIG. 8(b)), and the higher priority packets P1 and the medium priority packets P2 are transmitted to the receiving end by the transmission unit 13.

Then, when the network at the receiving end becomes further busier, in addition to the first thinning-out processing, the second thinning-out processing of thinning out all the packets P2 of the second group having the medium priorities, is performed in the transmission queue M in the relay server (see FIG. 8(c)), and only the higher priority packets P1 are transmitted to the receiving end by the transmission unit 13.

Thus, in the variation 2 of the third embodiment, according to the busyness state of the network, all the packets in one group, to which the same time stamps are attached, in the transmission queue in the relay server are thinned out. Therefore, when data which is coded according to MPEG system is transmitted, transmission of data which does not contribute toward keeping the image quality is avoided and reduction in the transmission rate can be effectively performed according to an image quality obtained at the receiving end.

(Embodiment 4.)

When packets are thinned out, an excessive gap is generated between sequence numbers and thereby calculation of an occurring rate of a retransmission request or a packet loss rate is adversely affected. In order to solve this problem, a data transmission method according to a fourth embodiment of the present invention performs, when packets input from the transmitting end are thinned out and transmitted in accordance with a predetermined rule, rewriting of sequence numbers of packets to be transmitted such that discontinuity in sequence numbers attached to respective packets does not occur due to the thinning-out of packets.

Figure 9:
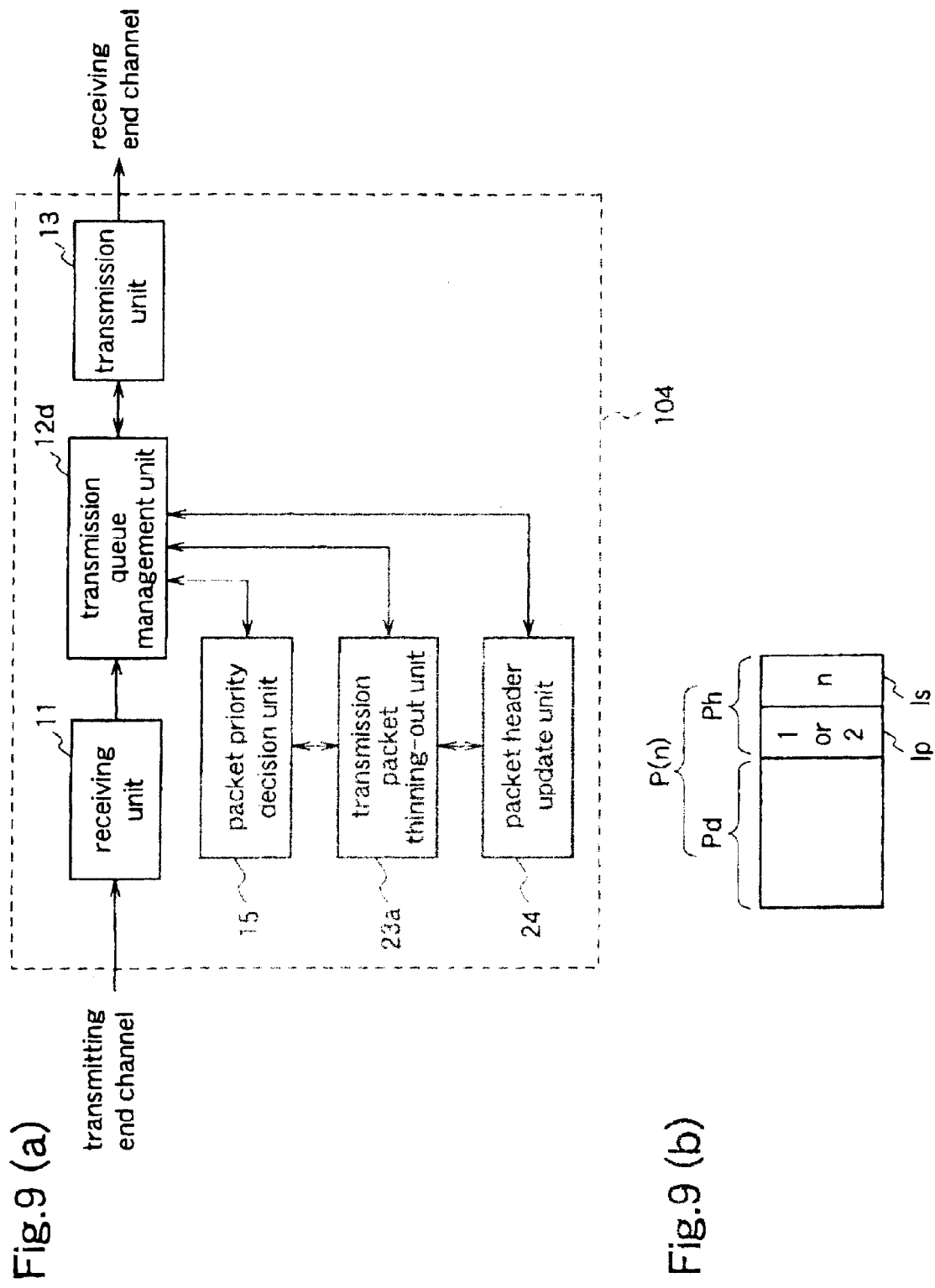
FIG. 9(a) is a block diagram illustrating a data transmission device according to a fourth embodiment of the present invention and FIG. 9(b) is a diagram illustrating a data structure of an input packet.

FIG. 9(a) is a block diagram illustrating the data transmission device according to the fourth embodiment.

A data transmission device 104 of the fourth embodiment, like the data transmission devices of the first to third embodiments, constitutes a relay server for relaying transmission data between a distribution server (transmitting end) and a terminal (receiving end). This data transmission device 104 of the fourth embodiment has a receiving unit 11 for receiving input packets which are transmitted from the distribution server, a transmission queue management unit 12d for setting a transmission order of the received input packets on the basis of predetermined information, and a transmission unit 13 for transmitting the respective packets in the transmission order set by the management unit 12d.

Further, the data transmission device 104 has a packet priority decision unit 15 for deciding priorities of the input packets, a transmission packet thinning-out unit 23a for deciding a packet to be thinned out on the basis of priorities or the like of respective packets in the transmission queue management unit 12d, and a packet header update unit 24 for rewriting a sequence number of a packet to be transmitted such that discontinuity in sequence numbers attached to respective packets due to the thinning-out of the packets does not occur.

The transmission queue management unit 12d has a transmission queue (not shown) as a data buffer for temporarily storing the input packets received by the receiving unit 11 and performs the packet thinning-out processing for the input packets on the basis of decision output from the transmission packet thinning-out unit 23a.

While a data structure of the input packet in the fourth embodiment is the same as those in the above embodiments, the input packet in the fourth embodiment includes information concerning a sequence number in addition to the information concerning the priority, as the relevant information stored in the header part, as shown in FIG. 9(b).

That is, an input packet P(n) (n: integer) comprises a data part Pd storing digital data and a header part Ph storing sequence number information Is and priority information Ip as relevant information relating to the digital data. Here, the input packet P(n) is a packet having an sequence number of "n" and its header part Ph contains a value "n" as the sequence number information Is. In addition, the header part Ph of this packet P(n) contains "1" indicating a higher priority or "2" indicating a lower priority, as a value of the priority information Ip.

Next, functions and effects will be described.

Figure 10:
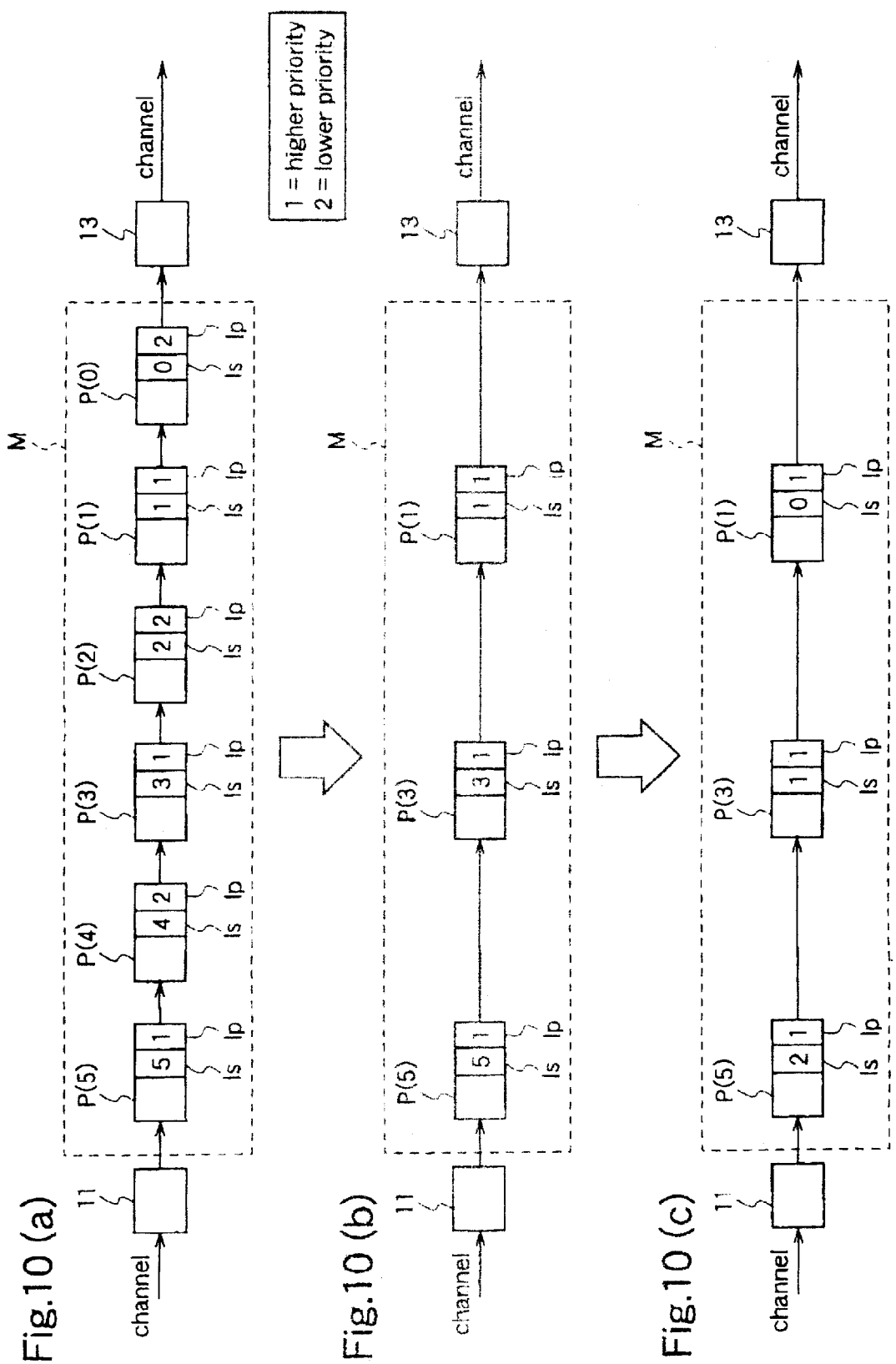
FIGS. 10(a)–10(c) are diagrams schematically illustrating transmission rate control in the data transmission device of the fourth embodiment.

FIGS. 10 are diagrams schematically illustrating transmission rate control in the data transmission device 104 of the fourth embodiment.

FIG. 10(a) show a state where packets (input packets) transmitted from the distribution server are stored in the transmission queue M in the relay server (data transmission device) 104. FIG. 10(b) shows a state where thinning-out processing for packets in the transmission queue M in the relay server is performed on the basis of the priorities. FIG. 10(c) shows a state where rewriting of the sequence numbers of the packets in the transmission queue M in the relay server is performed.

As shown in FIG. 10(a), packets from a packet P(0) of sequence number (0) to a packet P(5) of sequence number (5) are input as input packets to the data transmission device 104 as a relay server. Here, the packets P(0), P(2), and P(4) are lower priority packets and the packets P(1), P(3), and P(5) are higher priority packets.

The receiving unit 11 receives these input packets and outputs the same to the transmission queue management unit 12d. Then, priorities of the input packets in the transmission queue management unit 12d are decided by the packet priority decision unit 15. Further, by the transmission packet thinning-out unit 23a, packets to be thinned out in the transmission queue management unit 12d are decided on the basis of the priorities and packets P(1), P(3), and P(5) are decided as packets to be transmitted, as shown in FIG. 10(b). At this time, as shown in FIG. 10(c), by the packet header update unit 24, information in the header parts of packets P(1), P(3), and P(5) remaining after the thinning-out is performed are updated and, by this updating, the sequence number information Is of the packets P(1), P(3), and P(5) which are to be transmitted is rewritten such that discontinuity in sequence numbers attached to respective packets due to the thinning-out of the packets dose not occur.

Thereby, packets P(1), P(3), and P(5) having the sequence numbers "0", "1", and "2", respectively, are successively transmitted to the receiving terminal end by the transmission unit 13.

In this case, packets are transmitted to a receiving terminal end with keeping discontinuity in sequence numbers occurring at the transmitting end (distribution server) in the relay server, for example, a gap (discontinuity in sequence numbers) occurring due to packet loss in the Internet.

In the above-described fourth embodiment, the sequence numbers of the packets to be transmitted are rewritten such that discontinuity in the sequence numbers attached to respective packets due to the thinning-out of packets does not occur. Therefore, adverse influences on a calculation of a retransmission request or packet loss due to the thinning-out of packets can be avoided.

Further, in this fourth embodiment, the transmission of packets to the receiving terminal end is performed with keeping the gap (discontinuity in the sequence numbers) which occurs at the transmitting end in the relay server, due to the packet loss in the Internet. Therefore, an error packet due to a transmission error occurring at the transmitting end in the relay server can be recovered by a transmission request from the receiving terminal end.

In this fourth embodiment, when packets input from the transmitting end are thinned out and transmitted in accordance with a predetermined rule, the sequence numbers of the packets to be transmitted are rewritten such that the discontinuity in the sequence numbers attached to respective packets due to the thinning-out of packets does not occur. However, this transmission control of the fourth embodiment can be performed not only for the transmission of packets which are successively input from the transmitting end but also for at least one of the retransmission of a packet and the transmission of an FEC packet in the first embodiment, and the repeat transmission of a packet.

(Embodiment 5.)

A data transmission device according to a fifth embodiment of the present invention performs repeat transmission processing of repeatedly outputting a predetermined packet, and a correction packet transmission processing of transmitting a correction packet containing an error correcting code which corresponds to a predetermined packet, when an error occurring rate on an output end channel is a predetermined rate or higher.

Figure 11:
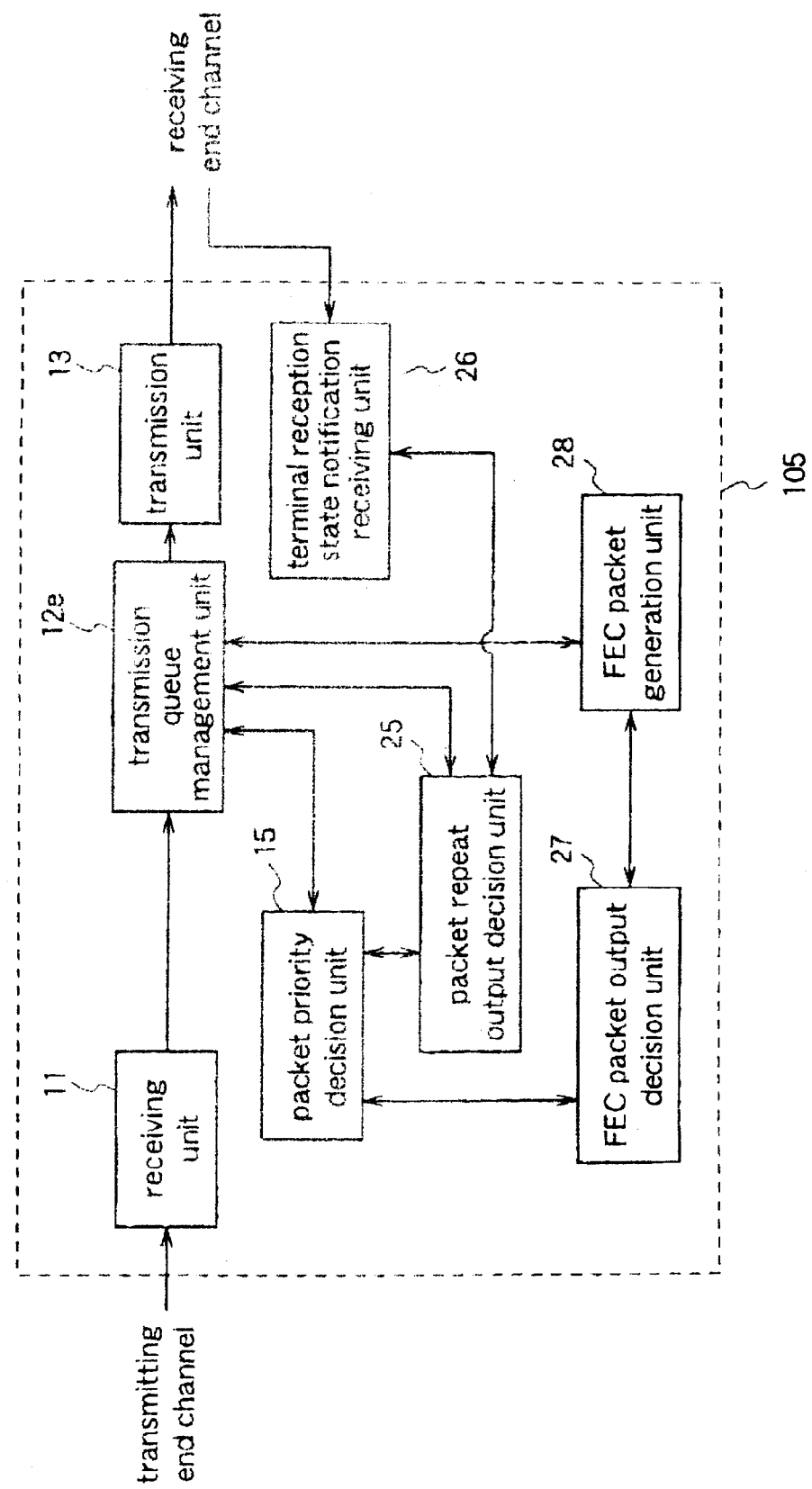
FIG. 11 is a block diagram illustrating a data transmission device according to a fifth embodiment of the present invention.

FIG. 11 is a block diagram illustrating the data transmission device according to the fifth embodiment.

A data transmission device 105 according to the fifth embodiment, like the data transmission devices of the first to fourth embodiments, constitutes a relay server for relaying transmission data between a distribution server (transmitting end) and a terminal (receiving end). The data transmission device 105 has a receiving unit 11 for receiving input packets which are transmitted from the distribution server, a transmission queue management unit 12e for setting a transmission order of the received input packets on the basis of predetermined information, and a transmission unit 13 for transmitting the respective packets in the transmission order set by the management unit 12e.

Further, the data transmission device 105 has a packet priority decision unit 15 for deciding priorities of the input packets, a terminal reception state notification receiving unit 26 for receiving a reception state which is transmitted by RTCP (Real-Time Control Protocol) or the like from the receiving terminal end, such as a communication error rate or a reception rate, and an error correction packet generation unit (FEC) 28 for generating a correction packet (FEC packet) containing an error correcting code for a predetermined packet in the transmission queue management unit 12e and outputting the correction packet to the transmission queue management unit 12e.

Further, the data transmission device 105 has a repeat output decision unit 25 for deciding a packet to be output repeatedly in the transmission queue management unit 12e, on the basis of the decision output from the packet priority decision unit 15 and the terminal reception state notification received by the terminal reception state notification receiving unit 26, and an FEC packet output decision unit 27 for deciding a packet in the transmission queue management unit 12e, to which packet an FEC packet is to be output, on the basis of the decision output from the packet priority decision unit 15, and a FEC packet generation unit 28 for generating an FEC packet Pfec corresponding to a predetermined higher priority packet Pa on the basis of the decision output from the decision unit 27.

Here, the transmission queue management unit 12e has a transmission queue (not shown) as a data buffer for temporarily storing the input packets received by the receiving unit 11 and decides a transmission order of the input packets, a repeat output packet and an FEC packet on the basis of the decision output from the repeat output decision unit 25 and decision output from the FEC packet output decision unit 27.

Next, functions and effects will be described.

Figure 12:
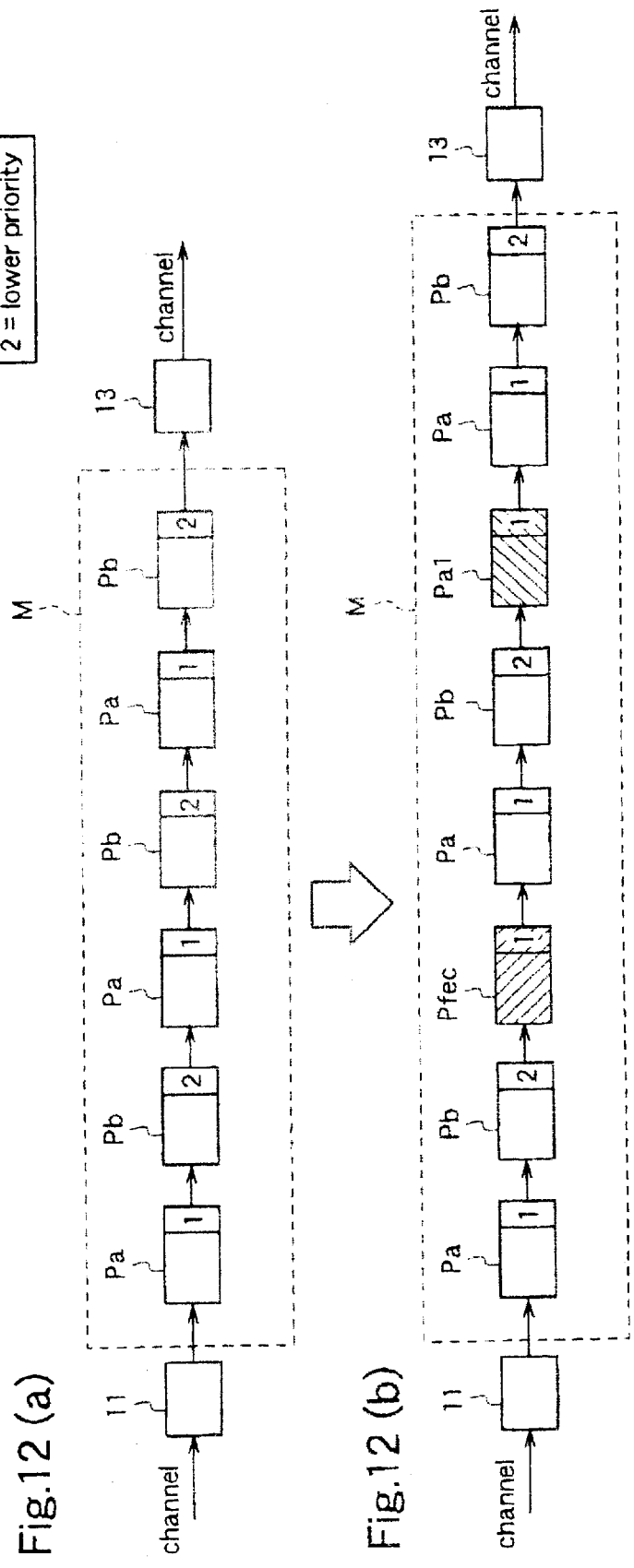
FIGS. 12(a) and (b) are diagrams schematically illustrating transmission rate control in the data transmission device of the fifth embodiment.
FIG. 12(b) shows a state where a repeat transmission packet and an FEC packet are added to the transmission queue M.

FIG. 12 are diagrams schematically illustrating transmission rate control in the data transmission device of the fifth embodiment.

FIG. 12(a) shows a state where packets (input packets) transmitted from the distribution server are stored in the transmission queue M in the relay server (data transmission device) 105. FIG. 12(b) shows a state where a repeat transmission packet and an FEC packet are added to the transmission queue M.

As shown in FIG. 12(a), when lower priority packets and higher priority packets are alternately input to the data transmission device 105 as a relay server, the receiving unit 11 receives these input packets and outputs the same to the transmission queue management unit 12e. At this time, priorities of the input packets in the transmission queue management unit 12e are decided by the packet priority decision unit 15. In addition, a reception state which is transmitted by the RTCP (Real-Time Control Protocol) or the like from the receiving terminal end, such as a communication error rate or a reception rate, is received by the terminal reception state notification receiving unit 26.

In addition, by the repeat output decision unit 25, a packet to be output repeatedly in the transmission queue management unit 12e is decided on the basis of the decision output from the packet priority decision unit 15 and the terminal reception state notification received by the terminal reception state notification receiving unit 26. Then, by the packet repeat output decision unit 25, on the basis of this decision by the decision unit 25, a higher priority packet to be output repeatedly is decided and notified to the transmission queue management unit 12e. Further, by the FEC packet output decision unit 27, a packet in the transmission queue management unit 12e, to which packet a FEC packet (correction packet) Pfec is to be output, is decided on the basis of the decision output from the packet priority decision unit 15. Then, by the FEC packet generation unit 28, on the basis of the decision output from the decision unit 27, a FEC packet Pfec for a predetermined higher priority packet Pa is generated and output to the transmission queue management unit 12e.

Then, from the transmission queue management unit 12e, as shown in FIG. 12(b), following the predetermined higher priority packet Pa decided by the decision unit 25, the same packet Pa1 as this higher priority packet is output to the transmission unit 13 as well as the FEC packet Pfec from the FEC packet generation unit 28 is output to the transmission unit 13.

Then, in addition to the input packets Pa and Pb, the same packet Pa1 as the predetermined higher priority packet Pa and the corresponding FEC packet (correction packet) Pfec are transmitted from the transmission unit 13 to the receiving terminal end.

To be specific, in the data transmission device 105 of the fifth embodiment, only when an error rate on the output end channel has a predetermined value or higher, repeat transmission of a higher priority packet having a priority of a predetermined value or higher and transmission of an FEC packet for the higher priority packet are performed.

Thus, in the fifth embodiment, in the data transmission device 105 as a relay server which is on a server end for a receiving terminal, upon receipt of a report on a reception state (an error rate or a reception rate) of the receiving terminal from the RTCP or the like, addition of an FEC packet and repeat transmission of a predetermined packet are performed according to the error rate or the transmission rate on the output channel, whereby recovery for communication errors can be performed together with the transmission rate control, in accordance with the reception state.

Further, the data transmission device of the fifth embodiment performs addition of an FEC packet and repeat transmission, to a packet having a priority of a predetermined value or higher, whereby changes in a transmission rate due to the transmission rate control can be suppressed.

In the fifth embodiment, processing of thinning out input packets which are transmitted to the receiving terminal end is not performed. However, when an error rate on the output end channel has a predetermined value or higher, predetermined packets can be thinned out to decrease a transmission rate.

Further, in the fifth embodiment, when an error occurring rate on the output end channel is a predetermined rate or higher, the repeat transmission processing of outputting a predetermined packet repeatedly, and correction packet transmission processing of transmitting a correction packet containing an error correcting code which corresponds to a predetermined packet are performed. However, the transmission control of the fifth embodiment can be performed not only for the transmission of packets which are successively input from the transmitting end but also for at least one of the retransmission of a packet and the transmission of an FEC packet in the first embodiment, and the repeat transmission of a packet.

For example, when the error rate on the channel is lower than a predetermined value, retransmission control is performed, and when the error rate on the channel has a predetermined value or higher, at least one of the repeat transmission of a packet and the transmission of an FEC packet is performed in addition to the retransmission control. Or, when the error rate on the channel is lower than the predetermined value, no special control for recovering errors is performed, and when the error rate on the channel has a predetermined value or higher, at least one of the retransmission control, the repeat transmission of a packet, and the transmission of an FEC packet is performed.

While, the data transmission device of this fifth embodiment performs the transmission of input packets as well as the repeat transmission of a higher priority packet and the transmission of an FEC packet, the data transmission device can perform relay processing of relaying input packets successively input from the distribution server (transmitting end) to output the same to the receiving end as well as one of the repeat transmission of a higher priority packet and the transmission of an FEC packet.

In the first to fifth embodiments, the methods which are used in a data transmission device for relaying input packets which are successively input from the transmitting end and outputting the same to the receiving terminal are described as a data transmission method. However, fundamental principles in data transmission methods according to respective claims of the present invention are not limited to the methods used in a relay server. For example, the fundamental principles can be applied to a method for relaying input packets which are successively input from a receiving terminal end and outputting the same to a transmitting end, or a method for transmitting data directly to a receiving terminal from a distribution server.

What is claimed is:

1. A data transmission method for performing relay processing of relaying plural input packets which are successively input from a transmitting end, to output the same to a receiving end, and for performing at least one of processing of retransmitting an input packet which is instructed to be retransmitted from the receiving end and processing of transmitting a correction packet containing an error correcting code for a predetermined input packet, said method comprising:

deciding a priority attached to each input packet input from the transmitting end and priorities attached to at least one additional packet constituted by at least one of the correction packet and the input packet which is instructed to be retransmitted;

thinning out the input packets and the at least one additional packet on the basis of the priority, and outputting the remaining packets which have remained after said thinning out; and transmitting the remaining packets;

wherein, in said thinning out, lower priority packets having lower priorities than the at least one additional packet, corresponding to a size of the at least one additional packet, are thinned out.

2. A data transmission method for relaying plural packets which are successively input from a transmitting end to output the same to a receiving end, said method comprising:

deciding a priority attached to each of the plural packets; and rearranging the successively input plural packets into plural groups each comprising a predetermined number of packets such that the packets in each group are transmitted in the order of descending priorities;

wherein, in said rearranging, a range of the packets in each of the plural groups which are to be subjected to said rearranging is decided such that all packets from a first input packet to a last input packet in the respective group are received by the receiving end in time for reproduction times in which the data are reproduced at the receiving end.

3. A data transmission method for relaying plural packets which are successively input from a transmitting end to output the same to a receiving end, said method comprising:

deciding a priority and reproduction time information attached to each of the input plural packets;

thinning out lower priority packets having lower priorities than a predetermined value in the input plural packets on the basis of the priority of each respective packet to output the remaining packets; and thinning out a part of the packets among the remaining packets on the basis of the reproduction time information of the remaining packets such that time intervals between data reproduction for remaining packets having same priorities at the receiving end are equal.

4. A data transmission method for relaying plural packets which are successively input from a transmitting end to output the same to a receiving end, said method comprising:

deciding a sequence number attached to each of the plural packets;

deciding a priority attached to each of the plural packets; and thinning out part of the plural packets on the basis of the priority to output the remaining packets;

wherein, in said thinning out, discrete sequence numbers of the remaining packets are sequentially renumbered.

5. A data transmission method for relaying plural packets which are successively input from a transmitting end to output the same to a receiving end, said method comprising:

detecting a priority attached to each of the plural packets which are successively input from the transmitting end;

detecting an error occurring rate on an output end channel; and transmitting the input plural packets to the receiving end on the basis of the priority of each of the plural packets and the error occurring rate;

wherein, in said transmitting of the input plural packets, when the error occurring rate is a predetermined rate or higher, a higher priority packet among the input plural packets is repeatedly transmitted, and a correction packet containing an error correcting code which corresponds to the higher priority packet is transmitted, and wherein, in said transmitting of the input plural packets, when the error occurring rate is lower than the predetermined rate, the input plural packets are transmitted without repeatedly transmitting the higher priority packet among the input plural packets and without transmitting the correction packet corresponding to the higher priority packet.

6. A data transmission device for performing relay processing of relaying plural input packets which are successively input from a transmitting end, to output the same to a receiving end, and for performing at least one of processing of retransmitting an input packet which is instructed to be retransmitted from the receiving end and processing of transmitting a correction packet containing an error correcting code for a predetermined input packet, said device comprising:

a decision unit operable to decide a priority attached to each input packet input from the transmitting end and priorities attached to at least one additional packet constituted by at least one of the correction packet and the input packet which is instructed to be retransmitted;

a unit operable to thin out the input packets and the at least one additional packet on the basis of the priority, and to output the remaining packets which have remained after the thinning out;

a transmission unit operable to transmit the remaining packets;

wherein, in the thinning out, lower priority packets having lower priorities than the at least one additional packet, corresponding to a size of the at least one additional packet, are thinned out.

7. A data transmission device for relaying plural packets which are successively input from a transmitting end to output the same to a receiving end, said device comprising:

a decision unit operable to decide a priority attached to each of the plural packets; and a unit operable to rearrange the successively input plural packets into plural groups each comprising a predetermined number of packets such that the packets in each group are transmitted in the order of descending priorities;

wherein, in the rearranging, a range of the packets in each of the plural groups which are to be subjected to the rearranging is decided such that all packets from a first input packet to a last input packet in the respective group are received by the receiving end in time for reproduction times in which the data are reproduced at the receiving end.

8. A data transmission device for relaying plural packets which are successively input from a transmitting end to output the same to a receiving end, said device comprising:
- a decision unit operable to decide a priority and reproduction time information attached to each of the input plural packets;
- a unit operable to thin out lower priority packets having lower priorities than a predetermined value in the input plural packets on the basis of the priority of each respective packet to output the remaining packets; and
- a unit operable to thin out a part of the packets among the remaining packets on the basis of the reproduction time information of the remaining packets such that time intervals between data reproduction for remaining packets having same priorities at the receiving end are equal.

9. A data transmission device for relaying plural packets which are successively input from a transmitting end to output the same to a receiving end, said device comprising:
- a decision unit operable to decide a sequence number and a priority attached to each of the plural packets; and
- a unit operable to thin out part of the plural packets on the basis of the priority to output remaining packets;
- wherein, during the thinning out, said unit operable to thin out part of the plural packets is further operable to sequentially renumber discrete sequence numbers of the remaining packets.

10. A data transmission device for relaying plural packets which are successively input from a transmitting end to output the same to a receiving end, said device comprising:
- a priority decision unit operable to decide a priority attached to each of the plural packets which are successively input from the transmitting end;
- a detecting unit operable to detect an error occurring rate on an output end channel; and
- a transmitting unit operable to transmit the input plural packets to the receiving end on the basis of the priority of each of the plural packets and the error occurring rate;
- wherein, when the error occurring rate is a predetermined rate or higher, said transmitting unit is operable to repeatedly transmit a higher priority packet among the input plural packets, and to transmit a correction packet containing an error correcting code which corresponds to the higher priority packet, and
- wherein, when the error occurring rate is lower than the predetermined rate, said transmitting unit is operable to transmit the input plural packets without repeatedly transmitting the higher priority packet among the input plural packets and without transmitting the correction packet corresponding to the higher priority packet.

* * * * *

UNITED STATES PATENT AND TRADEMARK OFFICE
CERTIFICATE OF CORRECTION

PATENT NO. : 6,891,799 B1
DATED : May 10, 2005
INVENTOR(S) : Makoto Hagai et al.

It is certified that error appears in the above-identified patent and that said Letters Patent is hereby corrected as shown below:

Title page,
Item [54], Title, please add -- AND DEVICE -- after "METHOD".
Item [75], Inventors, please change "Kashihara" to -- Kashiwara --.
Item [57], ABSTRACT,
Line 8, please delete "15" after "unit" and before "for".
Line 10, please delete "17" after "unit" and before "for".
Line 12, please delete "19" after "unit" and before "for".

Column 21,
Line 15, please add -- the -- after "having" and before "same".

Signed and Sealed this

Sixth Day of December, 2005

JON W. DUDAS
*Director of the United States Patent and Trademark Office*